US008082117B2

(12) United States Patent
Ozcan et al.

(10) Patent No.: US 8,082,117 B2
(45) Date of Patent: *Dec. 20, 2011

(54) OPTICAL IMAGE PROCESSING USING MINIMUM PHASE FUNCTIONS

(75) Inventors: Aydogan Ozcan, Boston, MA (US); Michel J. F. Digonnet, Palo Alto, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/623,322

(22) Filed: Nov. 20, 2009

(65) Prior Publication Data

US 2010/0067827 A1 Mar. 18, 2010

Related U.S. Application Data

(63) Continuation of application No. 11/396,935, filed on Apr. 3, 2006, now Pat. No. 7,643,952.

(60) Provisional application No. 60/668,445, filed on Apr. 5, 2005.

(51) Int. Cl.
*G06F 17/14* (2006.01)
*G01N 21/00* (2006.01)

(52) U.S. Cl. ............... 702/77; 702/78; 702/76; 356/432

(58) Field of Classification Search ................. 702/77, 702/78, 76
See application file for complete search history.

(56) References Cited

U.S. PATENT DOCUMENTS

| 5,530,544 | A | * | 6/1996 | Trebino et al. | 356/450 |
|---|---|---|---|---|---|
| 5,909,659 | A | * | 6/1999 | Fujita | 702/189 |
| 6,002,480 | A | | 12/1999 | Izatt et al. | |
| 6,219,142 | B1 | * | 4/2001 | Kane | 356/450 |
| 6,539,148 | B1 | | 3/2003 | Kim et al. | |

(Continued)

FOREIGN PATENT DOCUMENTS

JP 05-52740 3/1993

(Continued)

OTHER PUBLICATIONS

Arbore, M.A., et al., Engineerable compression of ultrashort pulses by use of second-harmonic generation in chirped-period-poled lithium niobate, *Opt. Lett.*, vol. 22, No. 17, Sep. 1997, pp. 1341-1343.

(Continued)

*Primary Examiner* — Hal Wachsman
(74) *Attorney, Agent, or Firm* — Knobbe, Martens, Olson & Bear LLP

(57) ABSTRACT

A method utilizes an optical image processing system. The method includes providing a measured magnitude of the Fourier transform of a complex transmission function of an object or optical image. The method further includes providing an estimated phase term of the Fourier transform of the complex transmission function. The method further includes multiplying the measured magnitude and the estimated phase term to generate an estimated Fourier transform of the complex transmission function. The method further includes calculating an inverse Fourier transform of the estimated Fourier transform, wherein the inverse Fourier transform is a spatial function. The method further includes calculating an estimated complex transmission function by applying at least one constraint to the inverse Fourier transform.

20 Claims, 30 Drawing Sheets

U.S. PATENT DOCUMENTS

| | | | |
|---|---|---|---|
| 6,657,727 | B1 | 12/2003 | Izatt et al. |
| 7,130,052 | B1* | 10/2006 | Kane ............................ 356/450 |
| 7,359,062 | B2 | 4/2008 | Chen et al. |
| 7,643,952 | B2* | 1/2010 | Ozcan et al. ..................... 702/77 |
| 7,733,497 | B2 | 6/2010 | Yun et al. |
| 2003/0174335 | A1* | 9/2003 | Sun et al. ...................... 356/450 |
| 2004/0239938 | A1 | 12/2004 | Izatt |
| 2007/0273958 | A1 | 11/2007 | Hirooka et al. |

FOREIGN PATENT DOCUMENTS

| | | |
|---|---|---|
| JP | 05-264402 | 10/1993 |
| JP | 10-10047 | 1/1998 |
| JP | 2003244426 | 8/2003 |
| WO | PCT/US2006/012136 | 4/2005 |

OTHER PUBLICATIONS

Birkedal, D., et al., Femtosecond Spectral Interferometry of Resonant Secondary Emission from Quantum Wells: Resonance Rayleigh Scattering in the Nonergodic Regime, *Phys. Rev. Lett.*, vol. 81, No. 11, Sep. 1998, p. 2372-2375.

Chen, X., et al., Temporally and spectrally resolved amplitude and phase of coherent four-wave-mixing emission from GaAs quantum wells, *Phys. Rev. B*, vol. 56, No. 15, Oct. 1997, pp. 9738-9743.

Chilla, Juan L.A., et al., Direct determination of the amplitude and the phase of femtosecond light pulses, *Opt. Lett.*, vol. 16, No. 1, Jan. 1991, pp. 39-41.

Chung, Jung-Ho, et al., Ambiguity of Ultrashort Pulse Shapes Retrieved from the Intensity Autocorrelation and the Power Spectrum, *IEEE J. Select. Quantum Electron.*, vol. 7, No. 4, Jul./Aug. 2001, pp. 656-666.

Davis, K.M., et al., Writing waveguides in glass with a femtosecond laser, *Opt. Lett.*, vol. 21, No. 21, Nov. 1996, pp. 1729-1731.

Dorrer, Christophe, et al., Spectral resolution and sampling issued in Fourier-transform spectral interferometry, *J. Opt. Soc. Am. B*, vol. 17, No. 10, Oct. 2000, pp. 1795-1802.

Dorrer, Christophe, Influence of the calibration of the detector on spectral interferometry, *J. Opt. Soc. Am. B*, vol. 16, No. 7, Jul. 1999, pp. 1160-1168.

Fienup, J.R., Reconstruction of an object from the modulus of its Fourier transform, *Opt. Lett.*, vol. 3, No. 1, Jul. 1978, pp. 27-29.

Fittinghoff, David N., et al., Measurement of the intensity and phase of ultraweak, ultrashort laser pulses, *Opt. Lett.*, vol. 21, No. 12, Jun. 1996, pp. 884-886.

Gallagher, Sarah M., et al., Heterodyne detection of the complete electric field of femtosecond four-wave mixing signals, *J. Opt. Soc. Am. B*, vol. 15, No. 8, Aug. 1998, pp. 2338-2345.

Geindre, J.P., et al., Frequency-domain interferometer for measuring the phase and amplitude of a femtosecond pulse probing a laser-produced plasma, *Opt. Lett.*, vol. 19, No. 23, Dec. 1994, pp. 1997-1999.

Gerchberg, R.W., et al., Practical Algorithm for the Determination of Phase from Image and Diffraction Plane Pictures, *Optik*, vol. 35, No. 2, 1972, Abstract only, one (1) page.

Hayes, Monson H., et al., Signal Reconstruction from Phase or Magnitude, *IEEE Trans. Acoust., Speech, Signal Processing*, vol. 28, No. 6, Dec. 1980, pp. 672-680.

Hee, Michael R., et al., Femtosecond transillumination tomography in thick tissue, *Opt. Lett.* vol. 18, No. 13, Jul. 1993, pp. 1107-1109.

Iaconis, C., et al., Spectral phase interferometry for direct electric-field reconstruction of ultrashort optical pulses, *Opt. Lett.*, vol. 23, No. 10, May 1998, pp. 792-794.

Lepetit, L., et al., Linear techniques of phase measurement by femtosecond spectral interferometry for applications is spectroscopy, *J. Opt. Soc. Am. B*, vol. 12, No. 12, Dec. 1995, pp. 2467-2474.

Linden, S., et al., XFROG—A New Method for Amplitude and Phase Characterization of Weak Ultrashort Pulses, *Phys. Stat. Sol. (B)*, vol. 206, No. 119, 1998, pp. 119-124.

Liu, X., et al., Laser Ablation and Micromachining with Ultrashort Laser Pulses, *IEEE J. Quant. Electr.*, vol. 33, No. 10, Oct. 1997, pp. 1706-1716.

Lu, Jian-yu, 2D and 3D High Frame Rate Imaging with Limited Diffraction Beams, *IEEE Transactions on Ultrasonics, Ferroelectrics, and Frequency Controls*, vol. 44, No. 4, Jul. 1997, pp. 839-856.

Meshulach, D., et al., Real-time spatial-spectral interference measurements of ultrashort optical pulses, *J. Opt. Soc. Am. B*, vol. 14, No. 8, Aug. 1997, pp. 2095-2098.

Nicholson, J.W., et al., Full-field characterization of femtosecond pulses by spectrum and cross-correlation measurements, *Opt. Lett.*, vol. 24, No. 23, Dec. 1999, pp. 1774-1776.

Nisoli, M., et al., Generation of high energy 10 fs pulses by a new pulse compression technique, *Appl. Phys. Lett.*, vol. 68, No. 20, May 1996, pp. 2793-2795.

Ozcan, A., et al., Group delay recovery using iterative processing of amplitude of transmission spectra of fibre Bragg gratings, *Electron. Lett.*, vol. 40, No. 18, Sep. 2004, two (2) pages.

Ozcan, A., et al., Iterative processing of second-order optical nonlinearity depth profiles, *Opt. Express*, vol. 12, No. 15, Jul. 2004, pp. 3367-3376.

Peatross, J., et al., Temporal decorrelation of short laser pulses, *J. Opt. Soc. Am. B*, vol. 15, No. 1, Jan. 1998, pp. 216-222.

Quatieri, Thomas F., Jr., et al., Iterative Techniques for Minimum Phase Signal Reconstruction from Phase or Magnitude, *IEEE Trans. Acoust., Speech, Signal Processing*, vol. 29, No. 16, Dec. 1981, pp. 1187-1193.

Reynaud, F., et al., Measurement of phase shifts introduced by nonlinear optical phenomena on subpicosecond pulses, *Opt. Lett.*, vol. 14, No. 5, Mar. 1989, pp. 275-277.

Rundquist, Andy, et al., Pulse shaping with the Gerchberg-Saxton algorithm, *J. Opt. Soc. Am. B*, vol. 19, No. 10, Oct. 2002, pp. 2468-2478.

Sala, Kenneth L., et al., CW autocorrelation measurements of picosecond laser pulses, *IEEE J. Quant. Electr.*, vol. QE-16, No. 9, Sep. 1980, pp. 990-996.

Siders, C.W., et al., Laser Wakefield Excitation and Measurement by Femtosecond Longitudinal Interferometry, *Phys. Rev. Lett.*, vol. 76, No. 19, May 1996, pp. 3570.

Siders, Craig W., et al., Plasma-Based Accelerator Diagnostics Based upon Longitudinal Interferometry with Ultrashort Optical Pulses, *IEEE Trans. Plasma Science*, vol. 24, No. 2, Apr. 1996, pp. 301-315.

Tignon, Jerome, et al., Spectral Interferometry of Semiconductor Nanostructures, *IEEE J. Quantum. Electron.*, vol. 35, No. 4, Apr. 1999, pp. 510-522.

Tokunaga, E., et al., Femtosecond continuum interferometer for transient phase and transmission spectroscopy, *J. Opt. Soc. Am. B*, vol. 13, No. 3, Mar. 1996, pp. 496-513.

Tokunaga, E., et al., Frequency-domain interferometer for femtosecond time-resolved phase spectroscopy, *Opt. Lett.*, vol. 17, No. 18, Aug. 1992, pp. 1131-1333.

Tokunaga, E., et al., Induced phase modulation of chirped continuum pulses studied with a femtosecond frequency-domain interferometer, *Opt. Lett.*, vol. 18, No. 8, Mar. 1993, pp. 370-372.

Trebino, Rick, et al., Using phase retrieval to measure the intensity and phase of ultrashort pulses: frequency-resolved optical gating, *J. Opt. Soc. Am. A*, vol. 10, No. 5, May 1993, pp. 1101-1111.

Wefers, Marc M., et al., Analysis of programmable ultrashort waveform generation using liquid-crystal spatial light modulators, *J. Opt. Soc. Am. B*, vol. 12, No. 7, Jul. 1995, pp. 1343-1362.

Weiner, A.M., et al., Encoding and decoding of femtosecond pulses, *Opt. Lett.*, vol. 13, No. 4, Apr. 1988, pp. 300-302.

Zgadzaj, Rafal, et al., Femtosecond pump-probe study of preformed plasma channels, *J. Opt. Soc. Am. B*, vol. 21, No. 8, Aug. 2004, pp. 1559-1567.

Peri, David, "Optical implementation of a phase retrieval algorithm," *Applied Optics*, vol. 26, Issue 9, 1987, pp. 1782-1785.

Office Action for Japanese Patent Application No. 2006-541655 dated May 18, 2010, 6 pages.

Ozcan, A. et al., "Inverse Fourier transform technique to determine second-order optical nonlinearity spatial profiles," *Applied Physics Letters*, vol. 82, No. 9, Mar. 3, 2003, pp. 1362-1364.

Pureur, D., et al., Absolute measurement of the second-order nonlinearity profile in poled silica, *Optics Letters*, vol. 23, No. 8, Apr. 15, 1998, pp. 588-590.

Office Action for Japanese Patent Application No. 2006-541655 dated Jan. 18, 2011.

\* cited by examiner

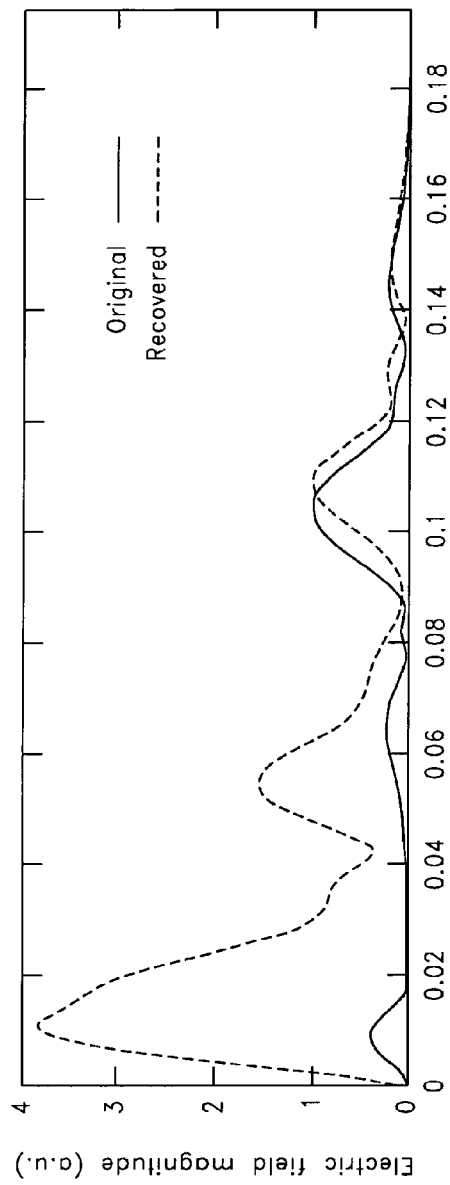
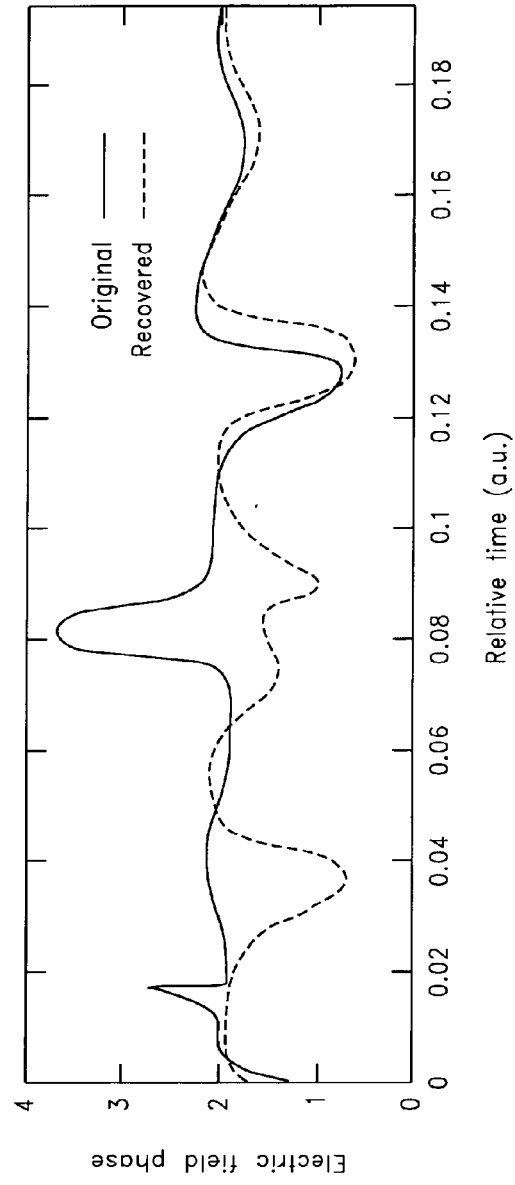
FIG.5A
FIG.5B

OPTICAL IMAGE PROCESSING USING MINIMUM PHASE FUNCTIONS

CLAIM OF PRIORITY

This application is a continuation from U.S. patent application Ser. No. 11/396,935, filed Apr. 3, 2006, now U.S. Pat. No. 7,643,952, which is incorporated in its entirety by reference herein, and which claims the benefit of U.S. Provisional Application No. 60/668,445, filed Apr. 5, 2005, which is incorporated in its entirety by reference herein.

BACKGROUND OF THE INVENTION

1. Field of the Invention

The present invention relates generally to apparatus and methods of optical image processing.

2. Description of the Related Art

Various simple optical systems yield the Fourier transform (FT) of a two-dimensional complex object function. (See, e.g. J. W. Goodman, "Introduction to Fourier Optics," McGraw-Hill, New York, 2002). Physical examples of such two-dimensional complex object functions include, but are not limited to, transparent objects such as photographic transparencies, spatial light modulators, and biological samples that modifies both the amplitude and the phase of transmitted (or reflected) optical waves. One additional example of such an optical system is simply the free-space propagation, far-field diffraction pattern (the Fraunhofer pattern). The Fraunhofer diffraction pattern yields the FT of the complex transmission function of an aperture that is illuminated with plane waves.

Another simple optical system that yields the FT of a two-dimensional complex object function is a thin converging lens. At the focal plane of the lens, the formed image is simply the FT of the object function placed anywhere before the image plane, preferably at the front focal plane. However, for both of the above-mentioned systems, only the FT magnitudes are detected, so direct phase measurement is a difficult task.

In other systems, femtosecond pulses have been extensively used in physics and chemistry to resolve fast transient response of various material properties. In many of these fields, the transient changes induced in the material properties due to the presence of a pump beam are of interest. To be able to record these fast transient effects, femtosecond spectral interferometry (SI) has been widely used. (See, e.g., F. Reynaud et al., "Measurement of phase shifts introduced by nonlinear optical phenomena on subpicosecond pulses," Opt. Lett., Vol. 14, page 275 (1989); E. Tokunaga et al., "Frequency-domain interferometer for femtosecond time-resolved phase spectroscopy," Opt. Lett., Vol. 17, page 1131 (1992); E. Tokunaga et al., "Induced phase modulation of chirped continuum pulses studied with a femtosecond frequency-domain interferometer," Opt. Lett., Vol. 18, page 370 (1993); J. P. Geindre et al., "Frequency-domain interferometer for measuring the phase and amplitude of a femtosecond pulse probing a laser-produced plasma," Opt. Lett., Vol. 19, page 1997 (1994); D. W. Siders et al., "Plasma-based accelerator diagnostics based upon longitudinal interferometry with ultrashort optical pulses," IEEE Trans. Plasma Science, Vol. 24, page 301 (1996); C. W. Siders et al., "Laser wakefield excitation and measurement by femtosecond longitudinal interferometry," Phys. Rev. Lett., Vol. 76, page 3570 (1996); R. Zgadzaj et al., "Femtosecond pump-probe study of preformed plasma channels," J. Opt. Soc. Am. B, Vol. 21, page 1559 (2004); L. Lepetit et al., "Linear techniques of phase measurement by femtosecond spectral interferometry for applications is spectroscopy," J. Opt. Soc. Am. B, Vol. 12, page 2467 (1995); S. M. Gallagher et al., "Heterodyne detection of the complete electric field of femtosecond four-wave mixing signals," J. Opt. Soc. Am. B, Vol. 15, page 2338 (1998); J. Tignon et al., "Spectral interferometry of semiconductor nanostructures," IEEE J. Quantum Electron., Vol. 35, page 510 (1999); X. Chen et al., "Temporally and spectrally resolved amplitude and phase of coherent four-wave-mixing emission from GaAs quantum wells," Phys. Rev. B, Vol. 56, page 9738 (1997); D. Birkedal et al., "Femtosecond spectral interferometry of resonant secondary emission from quantum wells: Resonance Rayleigh scattering in the nonergodic regime," Phys. Rev. Lett., Vol. 81, page 2372 (1998); C. Dorrer et al., "Spectral resolution and sampling issued in Fourier-transform spectral interferometry," J. Opt. Soc. Am. B, Vol. 17, page 1795 (2000); C. Dorrer, "Influence of the calibration of the detector on spectral interferometry," J. Opt. Soc. Am. B, Vol. 16, page 1160 (1999).)

SUMMARY OF THE INVENTION

In certain embodiments, a method processes an optical image. The method comprises providing a measured magnitude of the Fourier transform of a two-dimensional complex transmission function. The method further comprises providing an estimated phase term of the Fourier transform of the two-dimensional complex transmission function. The method further comprises multiplying the measured magnitude and the estimated phase term to generate an estimated Fourier transform of the two-dimensional complex transmission function. The method further comprises calculating an inverse Fourier transform of the estimated Fourier transform, wherein the inverse Fourier transform is a spatial function. The method further comprises calculating an estimated two-dimensional complex transmission function by applying at least one constraint to the inverse Fourier transform.

In certain embodiments, a computer system comprises means for estimating an estimated phase term of a Fourier transform of a two-dimensional complex transmission function. The computer system further comprises means for multiplying a measured magnitude of the Fourier transform of the two-dimensional complex transmission function and the estimated phase term to generate an estimated Fourier transform of the two-dimensional complex transmission function. The computer system further comprises means for calculating an inverse Fourier transform of the estimated Fourier transform, wherein the inverse Fourier transform is a spatial function. The computer system further comprises means for calculating an estimated two-dimensional complex transmission function by applying at least one constraint to the inverse Fourier transform.

BRIEF DESCRIPTION OF THE DRAWINGS

FIGS. 5A and 5B are plots of the magnitude and phase, respectively, of the original complex electric field temporal profile (solid lines) and the recovered complex electric field temporal profile (dashed lines) recovered by applying an exemplary embodiment to the Fourier transform magnitude of FIG. 4A.

DETAILED DESCRIPTION OF EXEMPLARY EMBODIMENTS

Figure 1A:
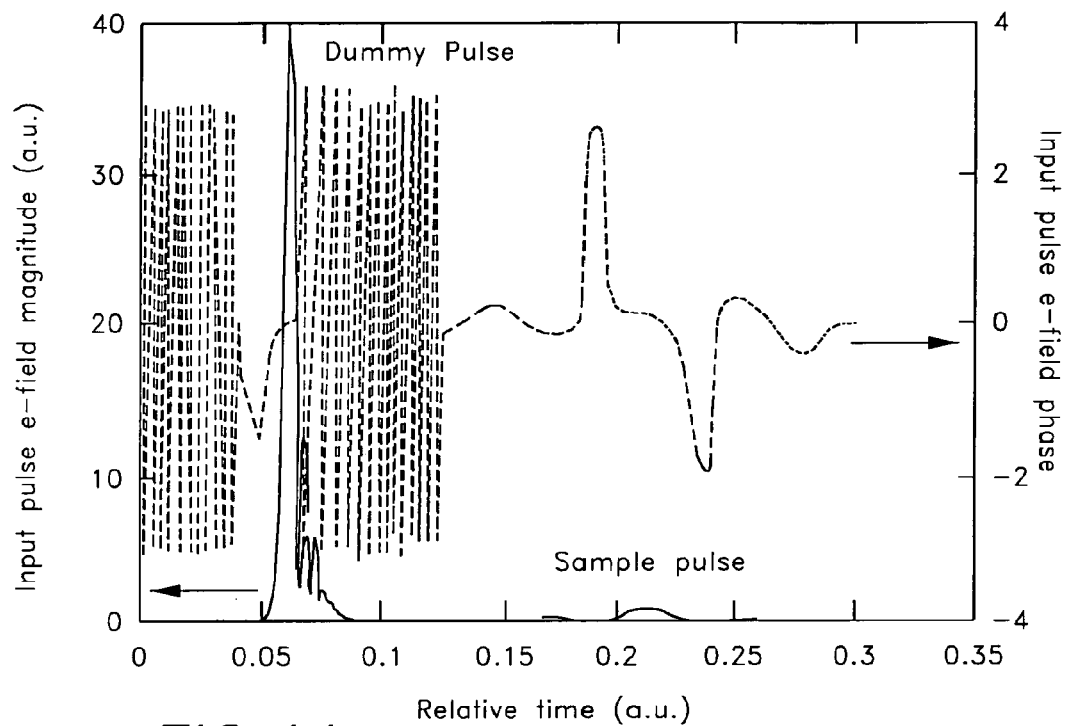
FIG. 1A is a plot of the complex electric field temporal profile (magnitude and phase shown by solid and dashed lines, respectively) of a pulse sequence formed by delaying a sample pulse in time with respect to a stronger dummy pulse.

Certain embodiments described herein are useful in computer-implemented analyses of the temporal waveforms of optical pulses, optical image processing, or femtosecond spectroscopy. The general-purpose computers used for such applications can take a wide variety of forms, including network servers, workstations, personal computers, mainframe computers and the like. The code which configures the computer to perform such processes is typically provided to the user on a computer-readable medium, such as a CD-ROM. The code may also be downloaded by a user from a network server which is part of a local-area network (LAN) or a wide-area network (WAN), such as the Internet.

The general-purpose computer running the software will typically include one or more input devices, such as a mouse, trackball, touchpad, and/or keyboard, a display, and computer-readable memory media, such as random-access memory (RAM) integrated circuits and a hard-disk drive. It will be appreciated that one or more portions, or all of the code may be remote from the user and, for example, resident on a network resource, such as a LAN server, Internet server, network storage device, etc. In typical embodiments, the software receives as an input a variety of information concerning the optical images, signals, or pulses.

Phase and Magnitude of Ultra-Short Optical Pulses

Ultra-short optical pulses with sub-picosecond time scales play a key role in many important applications such as medical imaging, surgery, micro-machining, optical communication, and 3D optical waveguide fabrication. (See, e.g., Jean-Claude Diels and Wolfgang Rudolph, "*Ultrashort Laser Pulse Phenomena: Fundamentals, Techniques and Applications on a Femtosecond Time Scale*," Elsevier, Academic Press, London (1996); M. R. Hee et al., "*Femtosecond transillumination tomography in thick tissue*," Opt. Lett., Vol. 18, pp. 1107-1109 (1993); X. Liu et al., "*Laser ablation and micromachining with ultrashort laser pulses*," IEEE J. Quant. Electr., Vol. 33, pp. 1706-1716, (1997); K. M. Davis et al., "*Writing waveguides in glass with a femtosecond laser*," Opt. Lett., Vol. 21, pp. 1729-1731 (1996); A. M. Weiner et al., "*Encoding and decoding of femtosecond pulses*," Opt. Lett., Vol. 13, pp. 300-302 (1988).)

In many of these applications, knowledge of the temporal profile of the optical pulse (both its phase and magnitude) is important. Over the last decade, many techniques have been developed to characterize ultra-short optical pulses. (See, e.g., K. L. Sala et al., "*CW autocorrelation measurements of picosecond laser pulses*," IEEE J. Quant. Electr., Vol. QE-16, pp. 990-996 (1980); J. L. A. Chilla and O. E. Martinez, "*Direct determination of the amplitude and the phase of femtosecond light pulses*," Opt. Lett., Vol. 16, pp. 39-41 (1991); J. Peatross and A. Rundquist, "*Temporal decorrelation of short laser pulses*," J. Opt. Soc. Am. B, Vol. 15, 216-222 (1998); J. Chung and A. M. Weiner, "*Ambiguity of ultrashort pulse shapes retrieved from the intensity autocorrelation and the power spectrum*," IEEE J. Select. Quantum Electron. pp. 656-666 (2001).)

These techniques can generally be divided into two categories: nonlinear and linear. Nonlinear techniques typically use a thin nonlinear crystal. The well-known nonlinear techniques include frequency-resolved optical gating (FROG) (see, e.g., R. Trebino and D. J. Kane, "*Using phase retrieval to measure the intensity and phase of ultrashort pulses: frequency-resolved optical gating*," J. Op. Soc. Am. A, Vol. 10, pp. 1101-1111 (1993)), spectral phase interferometry for direct electric-field reconstruction (SPIDER) (see, e.g., C. Iaconis and I. A. Walmsley, "*Spectral phase interferometry for direct electric field reconstruction of ultrashort optical pulses*," Opt. Lett., Vol. 23, pp. 792-794 (1998)), spectrally resolved cross-correlation (XFROG) (see, e.g., S. Linden et al., "*XFROG—A new method for amplitude and phase characterization of weak ultrashort pulses*," Phys. Stat. Sol. (B), Vol. 206, pp. 119-124 (1998)), and phase and intensity from cross-correlation and spectrum only (PICASO) (see, e.g., J. W. Nicholson et al., "*Full-field characterization of femtosecond pulses by spectrum and cross-correlation measurements*," Opt. Lett., Vol. 24, pp. 1774-1776 (1999)). Because the nonlinear process is generally weak, these techniques tend to require high peak powers and are generally not suitable for characterizing weak optical pulses.

Linear techniques were conceived in part to eliminate this power limitation. One exemplary linear technique is spectral interferometry (SI), which uses a linear detection system, such as an optical spectrum analyzer (OSA), to record in the frequency domain the interference between the sample pulse to be characterized and a reference pulse. (See, e.g., D. E. Tokunaga et al., "*Femtosecond continuum interferometer for transient phase and transmission spectroscopy*," J. Opt. Soc. Am. B, Vol. 13, pp. 496-513 (1996); D. Meshulach et al., "*Real-time spatial-spectral interference measurements of ultrashort optical pulses*," J. Opt. Soc. Am. B, Vol. 14, pp. 2095-2098 (1997).) Temporal analysis by dispersing a pair of light electric fields (TADPOLE) (see, e.g., D. N. Fittinghoff et al., "*Measurement of the intensity and phase of ultraweak, ultrashort laser pulses*," Opt. Lett., Vol. 21, pp. 884-886 (1996)) is a popular SI technique. Using the TADPOLE technique, the reference pulse is first fully characterized using a FROG set-up, then an OSA is used to measure the power spectra of the sample pulse and of a pulse sequence formed by delaying the reference pulse with respect to the sample pulse. These three measurements enable the recovery of the full complex electric field of the sample pulse, even if this pulse is very weak. Note that SI-based techniques utilize a fully-characterized reference pulse.

Certain embodiments described herein provide a novel linear method, referred to herein as "SIMBA", which uses a single optical spectrum analyzer ("OSA") measurement to recover the phase and magnitude of the complex electric field of weak ultra-short optical pulses. As used herein, the term "SIMBA" refers to either "spectral interferometry using minimum-phase-based algorithms" or "spectral interferometry using maximum-phase-based algorithms. Certain embodiments described herein are among the simplest and fastest of all the methods reported to date to measure the temporal shape of ultra-short optical pulses. Certain embodiments described herein are broadly applicable since the conditions of such embodiments are relatively lax as compared to other previously-used methods. In certain embodiments, SIMBA involves using an OSA to measure the power spectrum of a sequence of two pulses: a reference or dummy pulse combined with a sample pulse of weaker magnitude. Such a pulse sequence in which a large dummy pulse is followed by a weaker sample pulse approximates a minimum-phase function in certain embodiments. Such a pulse sequence in which a weaker sample pulse is followed by a large dummy pulse approximates a maximum-phase function in certain embodiments. In certain embodiments, the temporal profile of the sample pulse is recoverable using only the magnitude of the Fourier transform (e.g., the square root of the measured power spectrum) of the pulse sequence. As described below, this recovery of the temporal profile of the sample pulse can be carried out numerically with a simple iterative method that takes only seconds on a 500-MHz computer using MATLAB® 5, a computer software package for matrix calculations. With a faster computer and programming tool, this method has the capability to provide real-time dynamic measurements of laser pulse profiles.

Certain embodiments described herein provide various advantages over existing pulse-profile characterization methods which make SIMBA an excellent candidate for accurate, real-time characterization of ultrashort laser pulses. In certain embodiments, the temporal profile of the dummy pulse does not need to be known. Such embodiments can advantageously provide a significant time saving over other SI techniques which require first characterizing the dummy pulse. Certain embodiments advantageously work with weak sample pulses, unlike nonlinear techniques, as well as with strong sample pulses. The measurement configuration of certain embodiments described herein is advantageously simple by utilizing an OSA and not containing any moving parts. Certain embodiments advantageously utilize a single measurement. As compared to previously-known techniques (e.g., PICASO or TADPOLE which require 2 and 3 simultaneous measurements, respectively), certain such embodiments advantageously provide a fast determination of the temporal profile of the optical pulse. Certain embodiments are fast enough to allow real-time characterization of an optical pulse. Unlike certain previously-known techniques (e.g., second-harmonic FROG), certain embodiments advantageously can differentiate an ultrashort optical pulse from its time-reversed replica. Unlike many other SI-based techniques, certain embodiments described herein do not have any minimum constraint for the time delay between the dummy pulse and the sample pulse. Certain embodiments described herein can advantageously be used to simultaneously characterize a sequence of different sample pulses with a single measurement.

Certain embodiments described herein utilize a property of minimum-phase functions (MPFs) that allows the phase of the Fourier transform (FT) of the minimum-phase function to be extracted from its FT magnitude alone, either analytically or iteratively. (See, e.g., V. Oppenheim and R. W. Schafer, *Digital Signal Processing*, Prentice Hall, 2002, Chap. 7; T. F. Quatieri, Jr., and A. V. Oppenheim, "*Iterative techniques for minimum phase signal reconstruction from phase or magnitude*," IEEE Trans. Acoust., Speech, Signal Processing, Vol. 29, pp. 1187-1193 (1981); M. Hayes et al., "*Signal reconstruction from phase or magnitude*," IEEE Trans. Acoust., Speech, Signal Processing, Vol. 28, pp. 672-680 (1980).) Similarly, certain embodiments described herein utilize the same property of maximum-phase functions. While certain embodiments are described below by referring to MPFs, certain other embodiments similarly utilize maximum-phase functions.

Figure 1B:
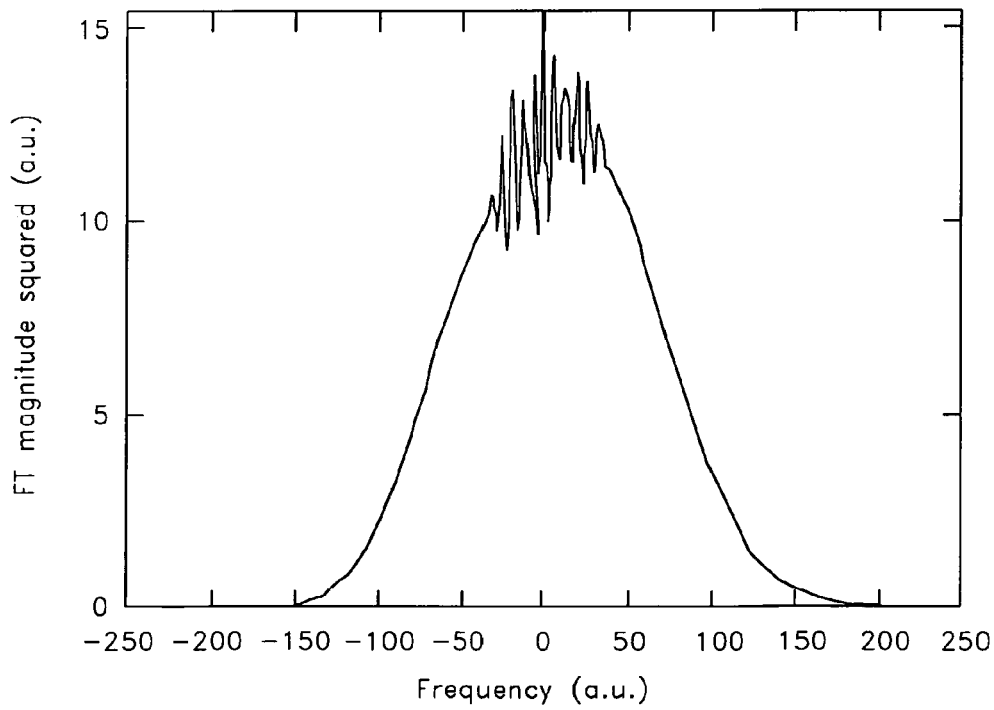
FIG. 1B is a plot of the power spectrum (i.e., square of the Fourier transform magnitude) of the complex electric field temporal profile of FIG. 1A.
Figure 2:
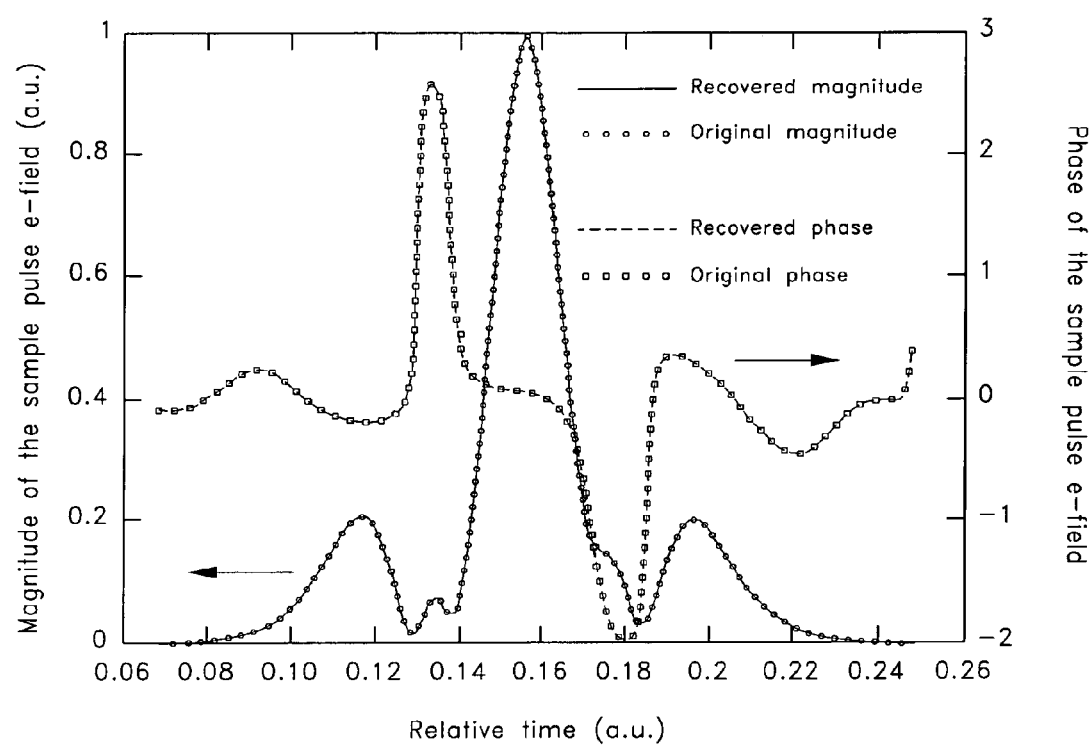
FIG. 2 is a plot of the original complex electric field temporal profile of FIG. 1A (solid lines) and a recovered complex electric field temporal profile (dashed lines) recovered using an exemplary embodiment from the power spectrum of FIG. 1B.

FIGS. 1A, 1B, and 2 illustrate the performance of certain embodiments described herein using numerical simulations of an arbitrary sample pulse. FIG. 1A illustrates the magnitude and phase of the electric field of a sequence of two pulses, namely a strong reference or dummy pulse followed by a sample pulse to be characterized. The sample pulse of FIG. 1A has an arbitrarily chosen temporal profile. A measured optical power spectrum of this pulse sequence (e.g., by sending the pulse sequence into an OSA, including a noise contribution, discussed more fully below) was simulated numerically, and is illustrated by FIG. 1B. The magnitude and phase of the weak sample pulse recovered by applying SIMBA to the optical power spectrum of FIG. 1B, without any other knowledge of the pulse sequence, is plotted in FIG. 2. The excellent accuracy of the recovery of the sample pulse temporal profile can be achieved with any sample pulse with properly-chosen properties (bandwidth and magnitude) of the dummy pulse and these properly-chosen properties are not excessively restrictive.

It is generally not possible to fully recover a one-dimensional function from the knowledge of its FT magnitude alone. However, there are families of functions which are exceptions to this rule for which the FT phase can be recovered from the FT magnitude alone, and visa versa. One exemplary such family is the family of minimum-phase functions (MPFs). An MPF is characterized by having a z-transform with all its poles and zeros either on or inside the unit circle. As a result of this property, the FT phase and the logarithm of the FT magnitude of an MPF are the Hilbert transforms of one another. Consequently, the FT phase of an MPF can be calculated from its FT magnitude, and an MPF can be reconstructed from its FT magnitude alone.

This reconstruction can be done by first taking the Hilbert transform of the logarithm of the function's FT magnitude (e.g., the logarithmic Hilbert transform of the function's FT magnitude) to obtain the FT phase, and then inverting the full complex FT. However, this direct approach can have difficulties in its implementation, such as phase unwrapping.

A second approach for the reconstruction is to use an iterative error-reduction method. Examples of iterative error-reduction methods include, but are not limited to, those described by J. R. Fienup, "*Reconstruction of an object from the modulus of its Fourier transform*," Opt. Lett., Vol. 3, pp. 27-29 (1978) or R. W. Gerchberg and W. O. Saxton, "*Practical algorithm for the determination of phase from image and diffraction plane pictures*," Optik, Vol. 35, pp. 237-246 (1972).

Figure 3:
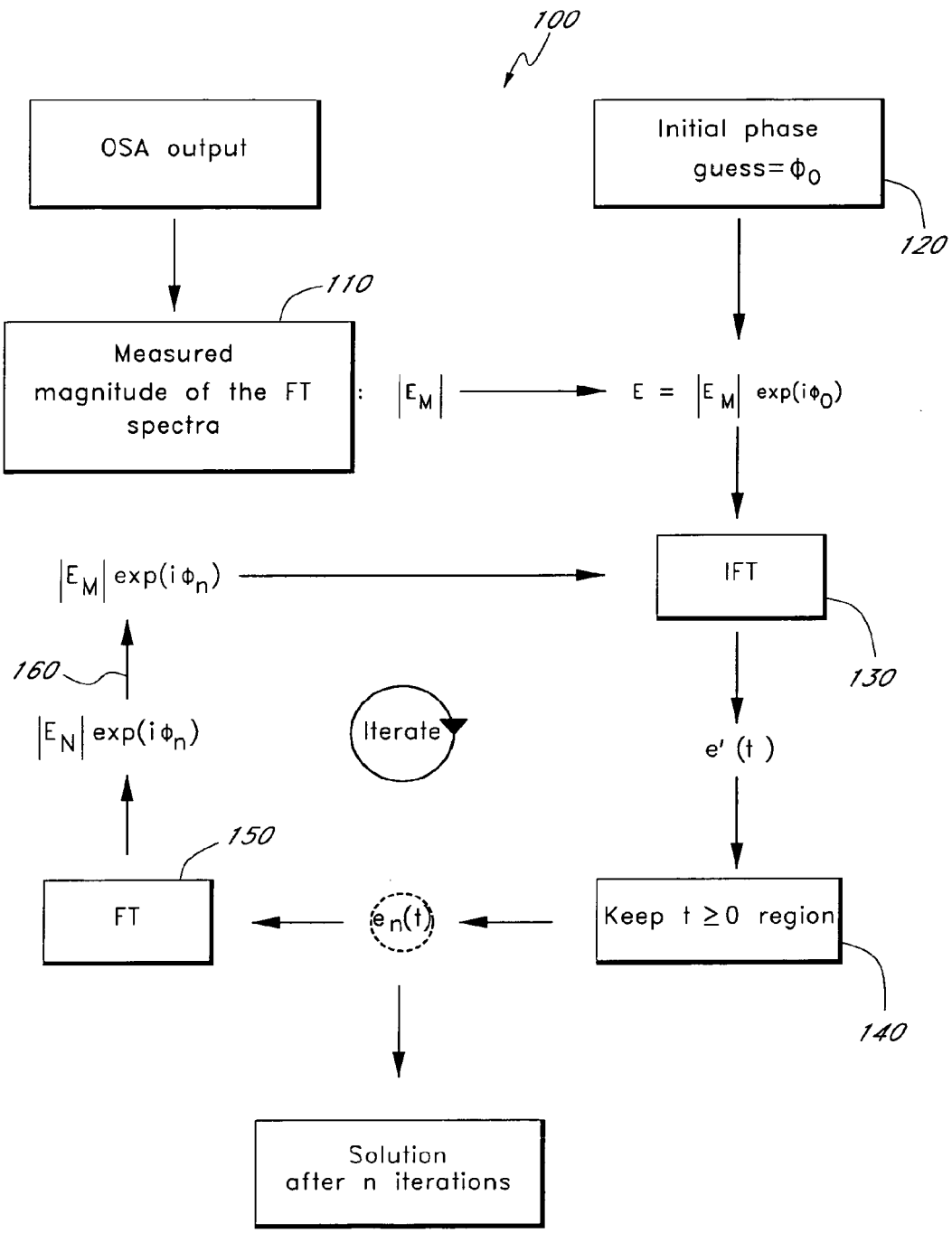
FIG. 3 is a flow diagram of an exemplary iterative error-reduction method compatible with certain embodiments described herein.

FIG. 3 is a flow diagram of an exemplary iterative error-reduction method 100 compatible with certain embodiments described herein. This iterative error-reduction 100 involves using a known (e.g., measured) Fourier transform magnitude spectrum of an unknown function e(t), together with known properties of this function (e.g., that it is a real function or a causal function), to correct an initial guess of e(t). In certain embodiments, this correction is done iteratively. In certain embodiments, the unknown function e(t) comprises the complex electric field temporal profile of a pulse sequence comprising a sample pulse and a dummy pulse, as described more fully below.

Given a complex MPF, e(t), the only quantity that is fed into the method 100 is the FT magnitude spectrum of e(t), i.e., $|E_M(f)|$, where the subscript M denotes that this spectrum is a measured quantity, as shown by the operational block 110. In certain embodiments, providing the measured FT magnitude spectrum comprises measuring a power spectrum of a pulse sequence comprising a sample optical pulse and a dummy pulse and calculating the square root of the measured power spectrum to yield the measured FT magnitude spectrum. In certain other embodiments, providing the measured FT magnitude spectrum comprises providing a previously-measured power spectrum of a pulse sequence comprising a sample optical pulse and a dummy pulse and calculating the square root of the previously-measured power spectrum.

Since the FT phase is missing, an initial guess, $\phi_0(f)$, for this phase is provided in the operational block 120. In certain embodiments, this guess does not significantly affect the accuracy of the result of the convergence of the method 100. For this reason, $\phi_0(f)$ can be conveniently chosen to equal zero (e.g., $\phi_0(f)=0$) or some other real or complex constant (e.g., $\pi$, $\pi/2$). In certain embodiments, the initial guess for the phase can be a previously-stored function $\phi_0(f)$ retrieved from the computer system. In certain embodiments, the initial guess for the phase can be a phase calculated from a previous optical pulse. In certain embodiments, the initial guess for the phase can be calculated from the measured magnitude using a logarithmic Hilbert transform.

In certain embodiments, the inverse Fourier transform (IFT) of $|E_M|\cdot\exp(j\phi_0)$ is then computed numerically, as shown by the operational block 130, yielding a function e'(t). In certain embodiments, the operational block 140 comprises applying at least one constraint to the estimated function e'(t). For example, in certain embodiments in which the pulse sequence approximates a minimum-phase function (MPF) (e.g., the dummy pulse precedes the sample pulse), since MPFs are causal, only the t≧0 portion of e'(t) is retained (e.g., the causality condition), and all values of e'(t) for t<0 are set to zero, thereby producing a new function $e_1(t)$. In certain embodiments in which the pulse sequence approximates a maximum-phase function (e.g., the sample pulse precedes the dummy pulse), since maximum-phase functions are anti-causal, only the t≦0 portion of e'(t) is retained (e.g., the anti-causality condition), and all values of e'(t) for t>0 are set to zero, thereby producing a new function $e_1(t)$. The recovered dummy pulse in such embodiments is on the negative time axis close to the origin and the sample pulse is recovered in the deeper part of the negative time axis.

In certain embodiments in which e(t) is known to be limited in time (e.g., to be less than 100 femtoseconds long), the operational block 140 can also include inserting zeros for times greater than this limit (e.g., t>100 femtoseconds) to produce the function $e_1(t)$, thereby advantageously speeding up convergence of the method 100. In certain embodiments in which the maximum peak power of the laser pulses are predetermined or known, the magnitudes of the intermediate functions can be constrained to be below or equal to the maximum peak power. In certain embodiments, the new function $e_1(t)$ provided by the operational block 140 serves as a first estimate of the complex MPF.

In certain embodiments, the FT of $e_1(t)$ is calculated in the operational block 150, thereby providing a new phase $\phi_1(f)$ and a new magnitude $|E_1(f)|$ for the FT of e(t). In certain embodiments, the magnitude of the calculated FT spectrum $|E_1(f)|$ is replaced by the measured magnitude $|E_M(f)|$, as shown by the arrow 160. In certain embodiments, the loop is then repeated using $|E_M(f)|$ and $\phi_1(f)$ as the new input function in the operational block 130, which provides a second function $e_2(t)$. In certain embodiments, only a single iteration is used, while in other embodiments, this loop is repeated until convergence is achieved. In certain embodiments, convergence is defined to be achieved when the difference between consecutive estimates of the function $\int|e_n(t)-e_{n-1}(t)|^2 dt / \int|e_n(t)|^2 dt$ is less than a predetermined value, for example 0.1%. In certain embodiments, less than 100 iterations are adequate for achieving convergence, taking a few seconds to compute using MATLAB® 5, a computer software package for matrix calculations, on a 500 MHz computer with $2^{14}$ data points. In certain embodiments, applying the constraint in the operational block 140 advantageously reduces the number of iterations which achieve convergence.

In certain other embodiments, the loop is repeated a predetermined number of times (e.g., 100). In certain embodiments, the predetermined number of times is selected to be sufficiently large so that the method achieves, or is close to achieving, convergence. In certain embodiments, at the end of the n-th iteration, $e_n(t)$ is the recovered complex MPF.

Empirical results indicate that such iterative error-reduction methods converge to the minimum-phase function corresponding to a given FT magnitude. (See, e.g., T. F. Quatieri, Jr., and A. V. Oppenheim, "*Iterative techniques for minimum phase signal reconstruction from phase or magnitude,*" IEEE Trans. Acoust., Speech, Signal Processing, Vol. 29, pp. 1187-1193 (1981); A. Ozcan et al., "*Iterative processing of second-order optical nonlinearity depth profiles,*" Opt. Express, Vol. 12, pp. 3367-3376 (2004); A. Ozcan et al., "*Group delay recovery using iterative processing of amplitude of transmission spectra of fibre Bragg gratings,*" Electron. Lett., Vol. 40, pp. 1104-1106 (2004).) In other words, for the infinite family of FT phase functions that can be associated with a known (e.g., measured) FT magnitude, certain embodiments described herein converge to the one and only one FT phase function that has the minimum phase. Since this solution is unique, if it is known a priori that the profile to be reconstructed is an MPF (or that the profile approximates an MPF), then the solution provided by the error-reduction method is the correct profile. Similarly, if it is known a priori that the profile to be reconstructed is a maximum-phase function (or that the profile approximates a maximum-phase function), then the solution provided by the error-reduction method is the correct profile.

To understand intuitively which physical functions are likely to be minimum-phase functions, an MPF is denoted by $e_{min}(n)$, where n is an integer that corresponds to sampled values of the function variable (e.g., relative time for the temporal waveform of ultra-short pulses). Because all physical MPFs are causal, $e_{min}(n)$ equals to zero for times less than zero (e.g., for n<0).

The energy of an MPF, defined as $$\sum_{n=0}^{m-1}|e_{min}(n)|^2$$

for m samples of the function $e_{min}(n)$, satisfies the inequality:

$$\sum_{n=0}^{m-1}|e_{min}(n)|^2 \geq \sum_{n=0}^{m-1}|e(n)|^2$$

for all possible values of m>0. In this inequality, e(n) represents any of the functions that have the same FT magnitude as $e_{min}(n)$. This property suggests that most of the energy of $e_{min}(n)$ is concentrated around n=0. Stated differently, any profile with a dominant peak around n=0 (e.g., close to the origin) will be either a minimum-phase function or close to one, and thus the profile will work extremely well with the iterative error-reduction method 100 outlined by FIG. 3. Although there may be other types of MPFs besides functions with a dominant peak, this class of MPFs can be used as described herein because they are straightforward to construct with optical pulses and because they yield exceedingly good results.

Figure 4A:
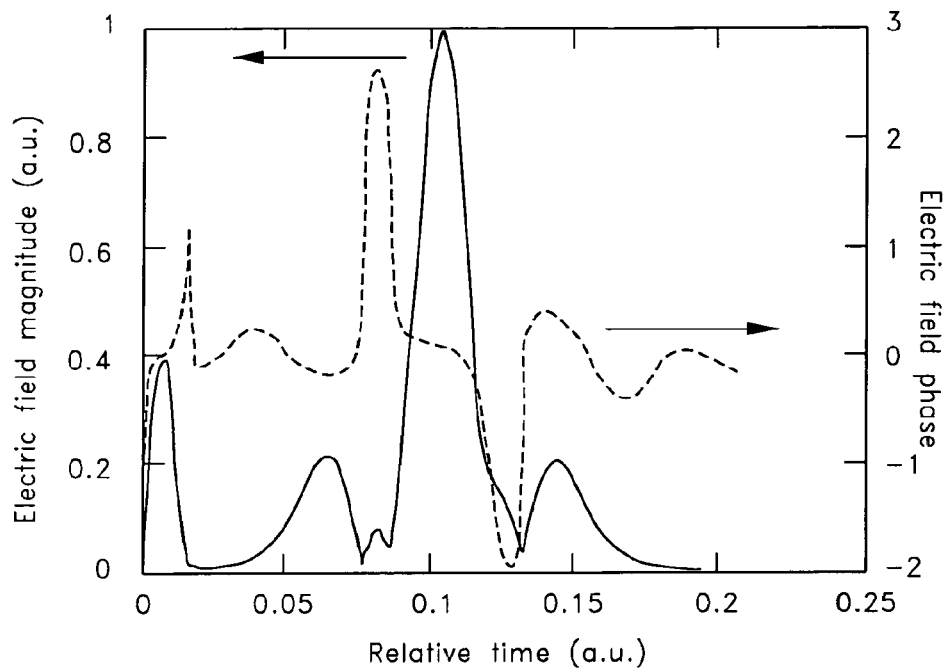
FIG. 4A is a plot of an exemplary complex electric field temporal profile of a pulse sequence, with the magnitude shown by the solid line and the phase shown by the dashed line.
Figure 4B:
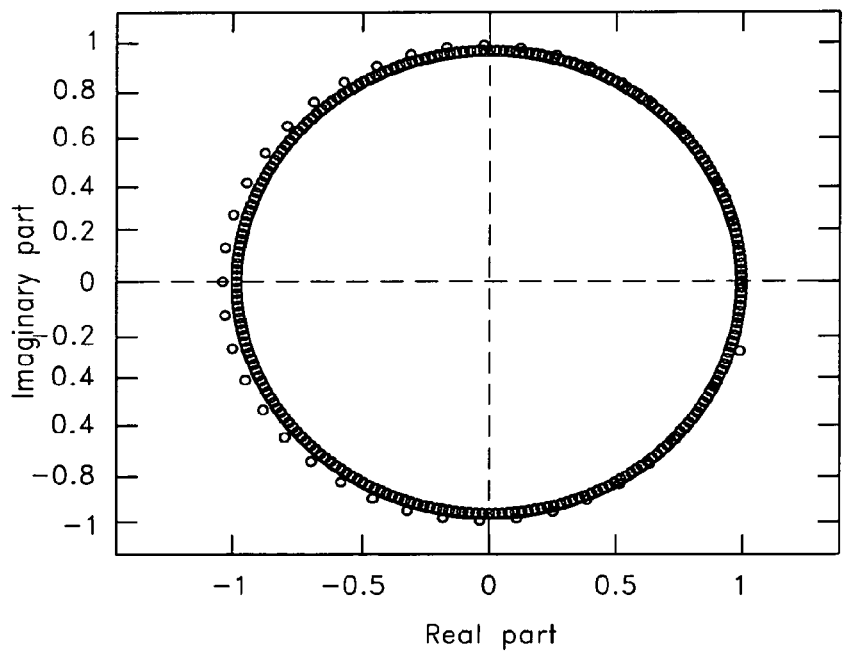
FIG. 4B is a pole-zero plot of the z-transform of the pulse sequence of FIG. 4A with zeros shown as circles.

To further illustrate the utility of a dominant peak close to the origin, FIG. 4A illustrates an exemplary complex electric field temporal profile of an optical pulse. As illustrated by FIG. 4A, the magnitude of this causal function has four peaks. One peak close to the origin (e.g., t=0) has a magnitude of approximately 0.4, and a dominant peak at approximately t=0.1 has a magnitude of approximately 1.0. Since the dominant peak is not the peak closest to the origin, this function is not an MPF. This result can be verified by the pole-zero plot of the pulse sequence's z-transform, as shown in FIG. 4B. Many of the zeros of the z-transform of the pulse sequence lie outside the unit circle, therefore the pulse sequence of FIG. 4A is not an MPF, and the phase and magnitude of the pulse sequence's FT cannot be accurately related by the logarithmic Hilbert transform or by iterative error-reduction methods.

The dashed curves of FIGS. 5A and 5B illustrate the magnitude and phase, respectively, of the complex electric field temporal profile recovered by applying the iterative method 100 of FIG. 3 to the FT magnitude of FIG. 4A. Both the recovered magnitude and phase functions are substantially different from the original functions, shown by the solid curves of FIGS. 5A and 5B (which are the same as those in FIG. 4A). As shown in FIG. 5A, the magnitude of the temporal profile recovered by the error-reduction method of FIG. 3 exhibits a large peak near t=0. The reason for this peak is that the method 100 converges to the minimum-phase function associated with the original FT magnitude spectrum, which must have a dominant peak near the origin.

Figure 6:
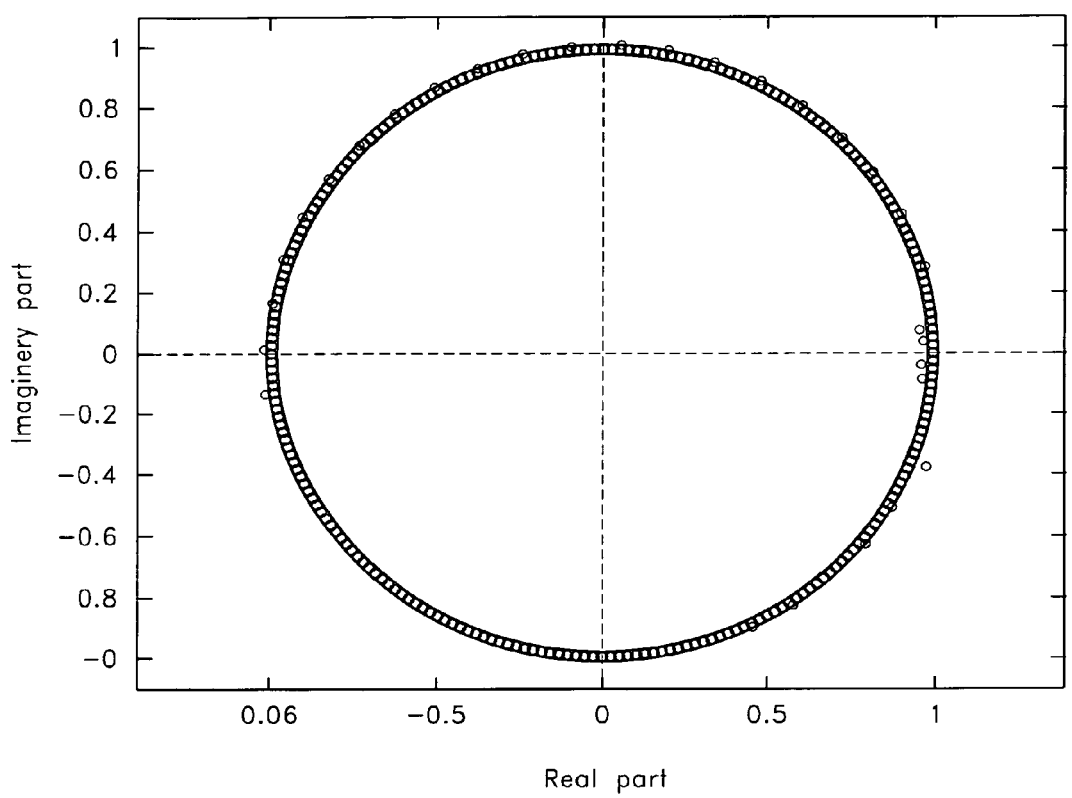
FIG. 6 is a pole-zero plot of the z-transform of the pulse sequence of a new pulse sequence formed in which the first waveform peak of FIG. 4A near t=0 is increased from approximately 0.4 to approximately 50, with zeros shown as circles.
Figure 7A:
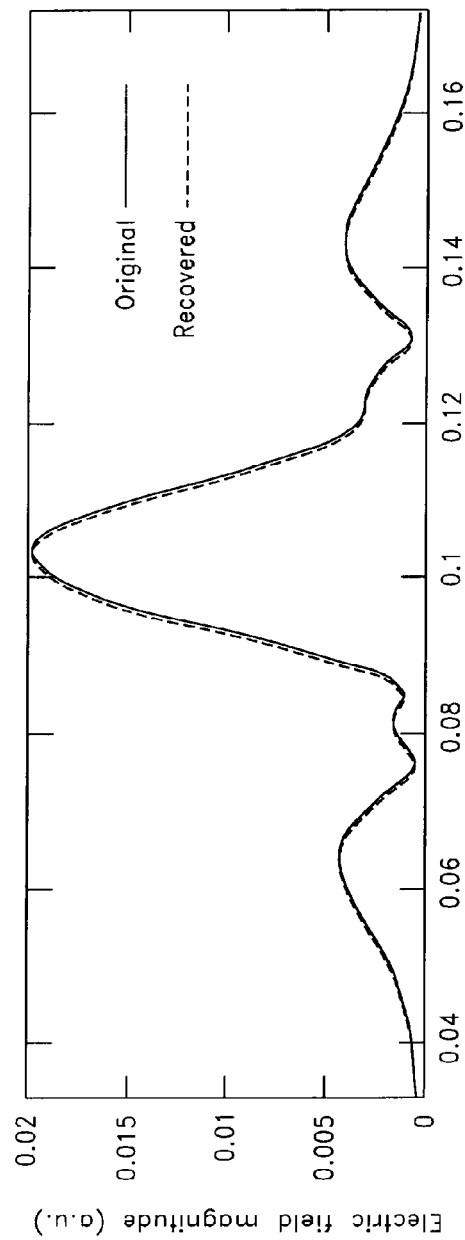
FIGS. 7A and 7B are plots of the magnitude and phase, respectively, of the original complex electric field temporal profile (solid lines) and the recovered complex electric field temporal profile (dashed lines) recovered by applying an exemplary embodiment to the Fourier transform magnitude of a new pulse sequence having a large waveform peak at t=0.
Figure 7B:
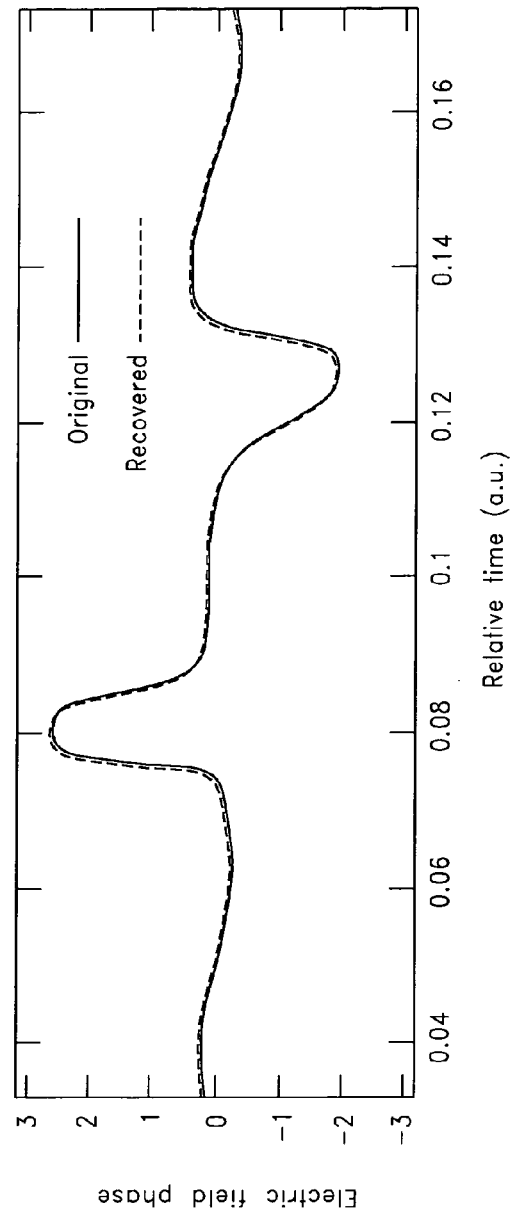

To illustrate aspects of certain embodiments of the method described herein, the magnitude of the first waveform peak near t=0 is increased from approximately 0.4, as shown in FIG. 4A, to a large value (e.g., approximately 50), so that this peak becomes the dominant peak. The phase of the waveform remains unchanged from that shown in FIG. 4A. The pole-zero plot of the new pulse sequence is illustrated by FIG. 6, and shows that almost all of the zeros of its z-transform are now either in or very close to the unit circle. Increasing the magnitude of the first peak pushes all the zeros of the temporal profile's z-transform towards the unit circle, thereby making the new pulse sequence closer to a true MPF. Mathematically, by increasing the magnitude of the first peak, the inequality $$\sum_{n=0}^{m-1} |e_{min}(n)|^2 \geq \sum_{n=0}^{m-1} |e(n)|^2,$$

which is another definition of an MPF, becomes easier to satisfy for all possible values of m>0. Since this new pulse sequence is very close to an MPF, the phase and magnitude of its FT are accurately related by the logarithmic Hilbert transform or by iterative methods. FIGS. 7A and 7B illustrate the magnitude and phase, respectively, of the original function (solid line) and the complex function recovered (dashed line) by applying the iterative method of FIG. 3 to the FT magnitude of the new pulse sequence. As shown by FIGS. 7A and 7B, the agreement between the original temporal profile and the recovered temporal profile is excellent.

Figure 8A:
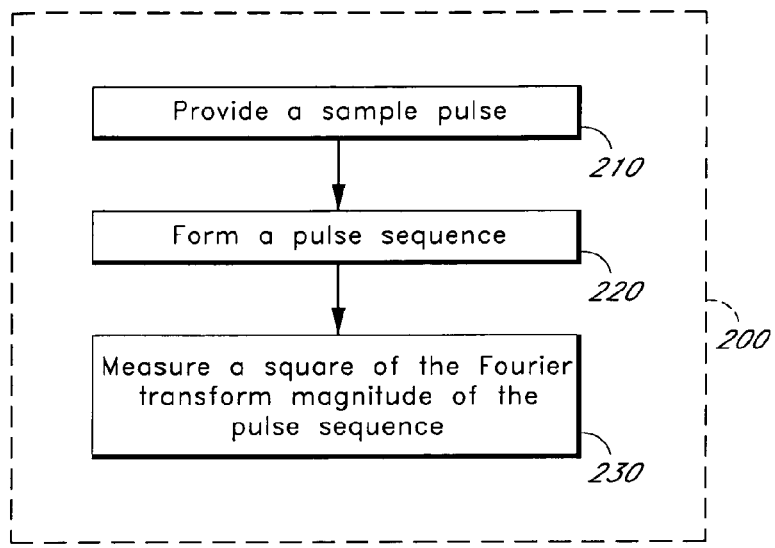
FIG. 8A is a flow diagram of a method of determining the complex electric field temporal profile of a sample optical pulse.
Figure 8B:
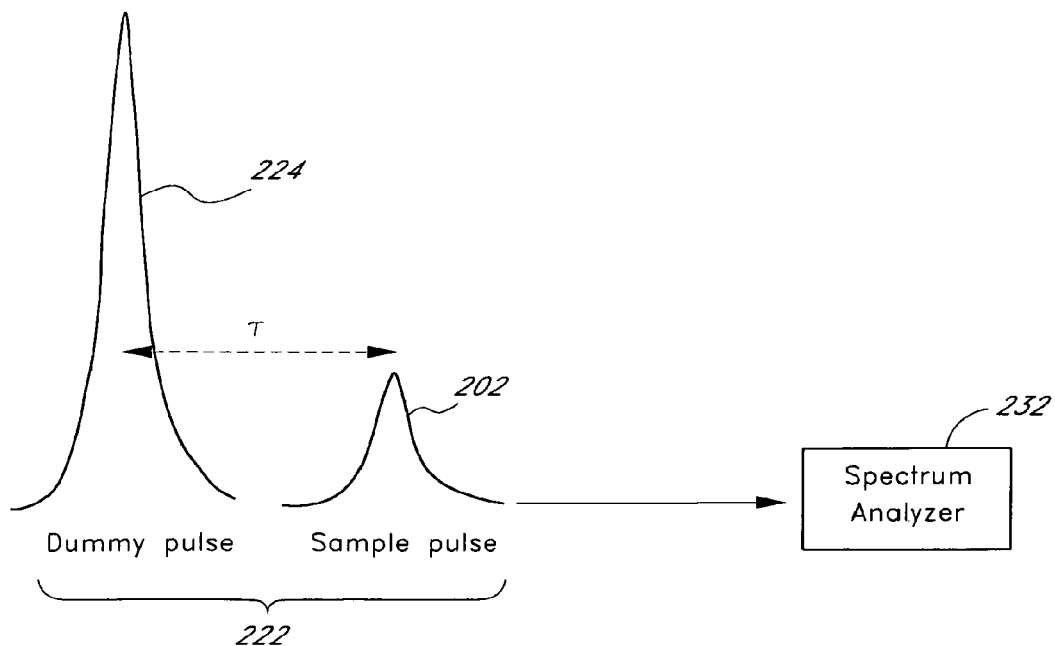
FIG. 8B schematically illustrates a configuration compatible with certain embodiments described herein.

FIG. 8A is a flow diagram of a method 200 of determining the complex electric field temporal profile of a sample optical pulse 202. FIG. 8B schematically illustrates a measurement configuration compatible with certain embodiments described herein. In an operational block 210, the sample optical pulse 202 is provided. In certain embodiments, the sample optical pulse 202 is an ultra-short optical pulse having a pulse width in a range between approximately 10 femtoseconds and approximately 1 picosecond. Other pulse widths are also compatible with certain embodiments described herein.

In an operational block 220, a pulse sequence 222 is formed by combining a strong dummy pulse 224 and the sample optical pulse 202 with a time period between the dummy pulse 224 and the sample optical pulse 202. In certain embodiments, the dummy pulse 224 precedes the sample pulse 202 (e.g., the dummy pulse 224 enters the spectrum analyzer 232 before the sample pulse 202 does) such that the pulse sequence 222 approximates a minimum-phase function. In certain other embodiments, such as that schematically illustrated by FIG. 8B, the sample pulse 202 precedes the dummy pulse 224 (e.g., the sample pulse 202 enters the spectrum analyzer 232 a time period $\tau$ before the dummy pulse 224 does). In certain such embodiments, the pulse sequence 222 approximates a maximum-phase function.

In an operational block 230, a square of the FT magnitude of the pulse sequence is measured. In certain embodiments, this measurement is performed by sending the pulse sequence 222 into an OSA 232. The OSA 232 of certain embodiments comprises a computer which determines the complex electric field temporal profile of the sample pulse 202. The OSA 232 of certain other embodiments is coupled to a computer 240 which determines the complex electric field temporal profile of the sample pulse 202. As discussed above, by adding a strong dummy pulse 224 to the sample pulse 202, the complex temporal profile of the pulse sequence 222 approximates an MPF or a maximum-phase function. The complex temporal profile of the sample pulse 202 is then recoverable from the measured spectrum using an error-reduction method such as the one shown in FIG. 3.

Figure 9A:
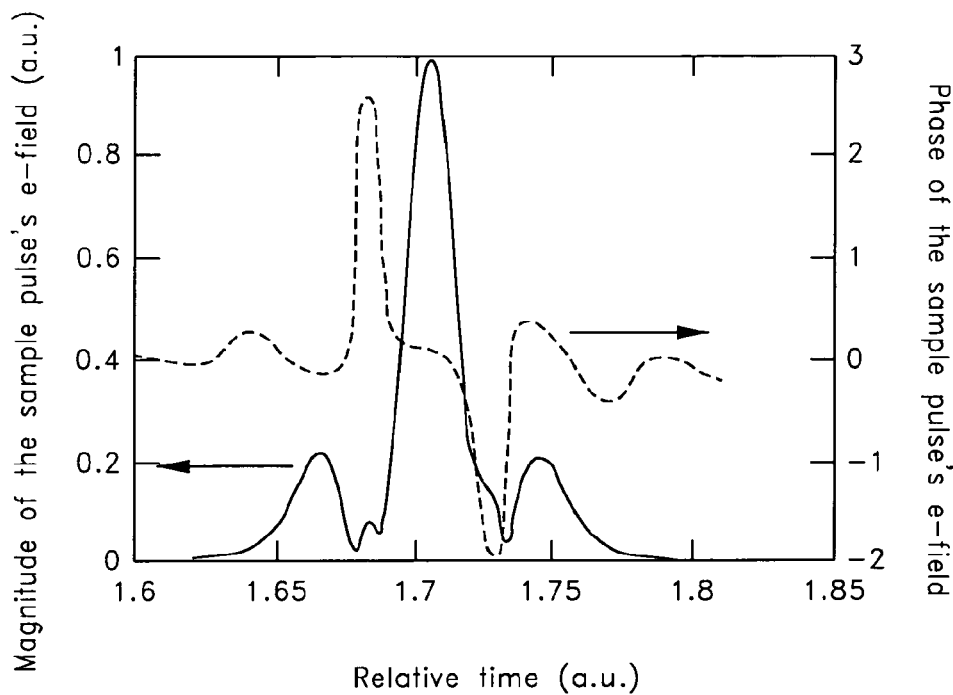
FIG. 9A illustrates an exemplary sample pulse with the magnitude shown as a solid line and the phase shown as a dashed line.
Figure 10A:
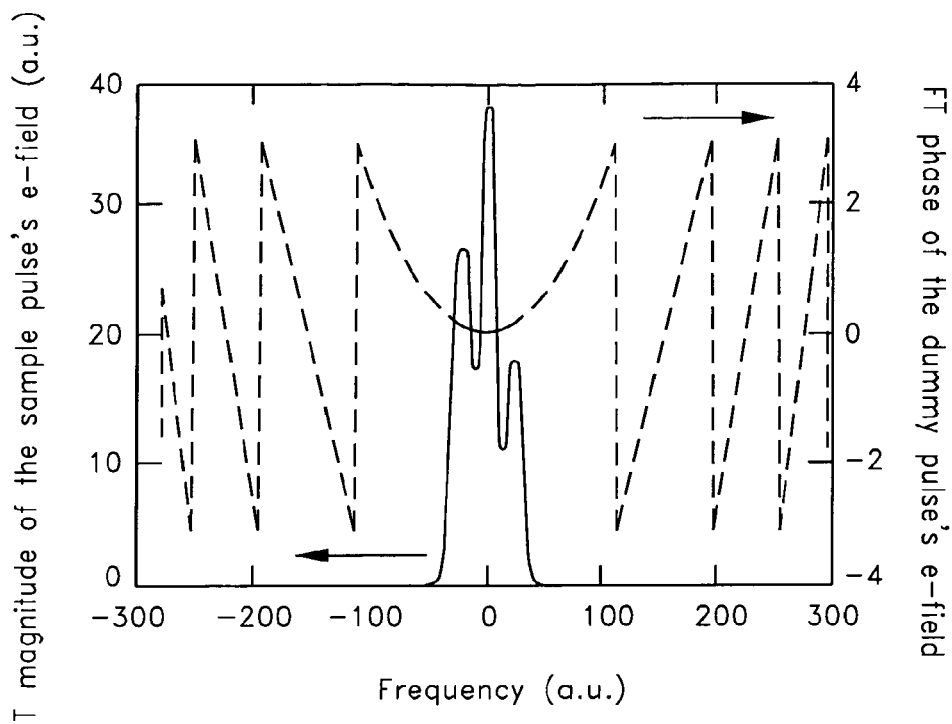
FIG. 10A illustrates the calculated magnitude (solid line) and phase (dashed line) of the Fourier transform spectrum of the sample pulse of FIG. 9A.

FIG. 9A illustrates an exemplary sample pulse 202 used to demonstrate an exemplary embodiment of the SIMBA method step-by-step. The solid curve of FIG. 9A is the magnitude of the temporal electric field profile of the sample pulse 202, and the dashed curve is its phase. This sample pulse 202 was selected arbitrarily, except that its FT was selected to have a strong second-order phase, as shown in FIG. 10A. In certain such embodiments, the strong second-order phase makes it more difficult to retrieve the complex temporal profile of the sample pulse 202. The phase and magnitude of the sample pulse 202 were also selected such that the FT magnitude spectrum, calculated numerically and shown in FIG. 10A, resembles the spectrum of typical optical pulses expected to be determined using embodiments described herein.

Figure 9B:
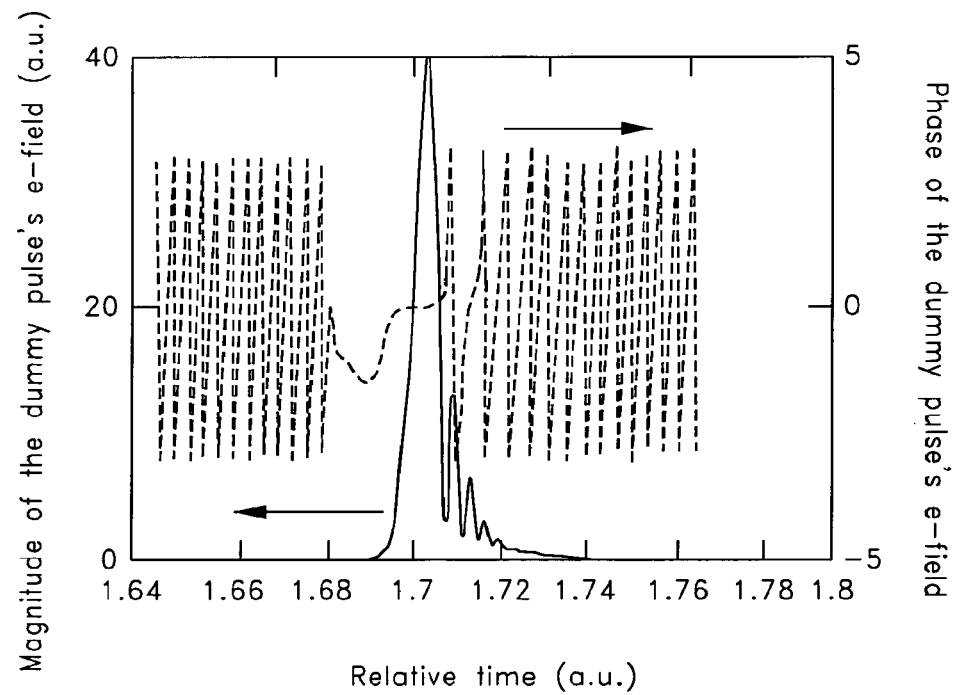
FIG. 9B illustrates an exemplary dummy pulse with the magnitude shown as a solid line and the phase shown as a dashed line.
Figure 10B:
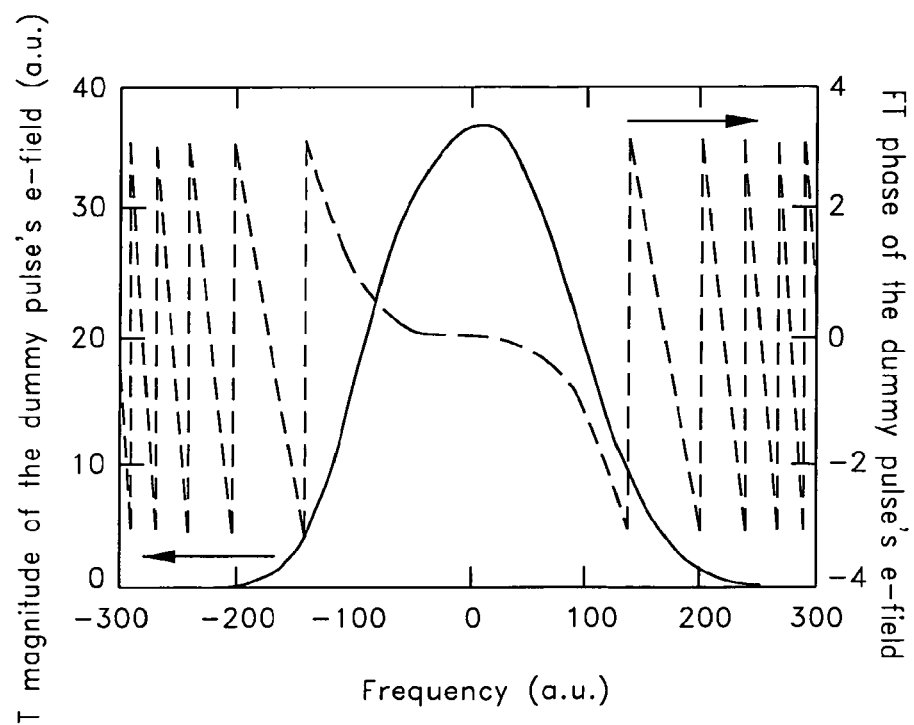
FIG. 10B illustrates the calculated magnitude (solid line) and phase (dashed line) of the Fourier transform spectrum of the dummy pulse of FIG. 9B.

FIG. 9B shows the magnitude and phase of the reference or dummy pulse 224. The calculated FT spectrum of this dummy pulse 224 is plotted in FIG. 10B. The shape of the dummy pulse 224 of FIG. 10B was selected arbitrarily, with a large amount of third-order phase in its FT. This feature of the dummy pulse 224 is responsible for the oscillations in the tail of the pulse magnitude illustrated by FIG. 9B. As disclosed above, the peak magnitude of the dummy pulse electric field was taken to be much larger than that of the sample pulse 202. For the sample pulse 202 and the dummy pulse 224 of FIGS. 9A and 9B, the peak magnitude of the dummy pulse 224 is larger than that of the sample pulse 202 by a factor of approximately 40, corresponding to a factor of approximately 1600 in power.

In certain embodiments, the sample pulse 202 is delayed in time by $\tau$ with respect to the dummy pulse 224 to form the pulse sequence 222. As shown in FIG. 1A, this pulse sequence 222 approximates an MPF. In certain embodiments, the time delay $\tau$ is sufficiently large so that the sample pulse 202 and the dummy pulse 224 do not overlap. This condition is not as strict as conditions required by other SI techniques which require larger minimum delays to avoid aliasing in the inverse FT domain, which would make the recovery impossible. In certain embodiments described herein, aliasing can be present because it does not affect the recovery process. The delay τ of certain embodiments is sufficiently small so as to avoid high-frequency oscillations in the measured spectrum of the pulse sequence 222, which would require a higher resolution OSA. Sending the pulse sequence 222 into an OSA yields the square of the FT magnitude of the complex electric field temporal profile, as shown in FIG. 1B. The oscillations near the center of the power spectrum of FIG. 1B are due to the interference between the electric fields of the sample pulse 202 and the dummy pulse 224.

In certain embodiments, the power spectrum, such as illustrated by FIG. 1B, contains all the necessary information to recover the complex electric field of the sample pulse 202. In certain embodiments, this recovery is achieved by applying the method 100 shown in FIG. 3 to the square root $|E_M(f)|$ of the power spectrum of FIG. 1B. The magnitude and phase of the electric field of the sample pulse 202 obtained by this method 100 are plotted as dashed curves in FIG. 2. Comparison to the magnitude and phase of the original sample pulse 202, reproduced from FIG. 9A and included in FIG. 2 as solid curves, shows that both the magnitude and phase components of the recovered sample pulse are virtually indistinguishable from the components of the original sample pulse 202.

Certain embodiments described herein advantageously recover the complex electric field of an optical pulse from a single FT magnitude measurement, without any additional information about the reference or dummy pulse 224. The result of FIG. 2 utilized a computation time of only a few seconds using MATLAB® 5, a computer software package for matrix calculations, on a 500-MHz computer. The number of data points used to simulate the measured FT magnitude, shown in FIG. 1B, was limited to approximately 1500. To increase the resolution and speed of the processing (which involves fast FT routines), the total number of points was increased to approximately $2^{14}$ by zero padding. Real-time characterization of ultra-short optical pulses using embodiments described herein is possible by using a much faster programming environment such as C++. In certain embodiments, this recovery could be done using the analytical logarithmic Hilbert transform instead of an iterative approach, although the results of such a recovery could be more susceptible to noise.

In certain embodiments in which the arrival times of the input pulses are not recorded, the recovered temporal profile exhibits a time shift compared to the actual temporal profile. FIG. 2 does not show this time shift because, for comparison purposes, the recovered profile was shifted to match the original profile. This time shift is common to many existing recovery techniques, and it is totally inconsequential.

The recovered phase shown in FIG. 2 has a slight, inconsequential deviation, especially towards the edges of FIG. 2. This deviation is primarily due to the intensity of the optical pulse is very weak at those times, which makes the phase recovery less accurate. In the limiting case in which the pulse intensity goes to zero at these times, the recovery of the exact phase becomes almost impossible. However, since the phase of a zero field is meaningless, this limitation is inconsequential. This same phenomena is also present in other existing techniques (e.g., FROG, TADPOLE, and SPIDER).

In certain embodiments, the recovery of the temporal profile of the optical pulse after applying time-reversal to at least one of the components of the pulse sequence (e.g., the sample pulse 202, the dummy pulse 224, or both the sample pulse 202 and the dummy pulse 224) is as accurate as the recovery of the temporal profile of the optical pulse without time-reversal being applied. This result indicates that certain embodiments described herein can conveniently differentiate between a pulse and its time-reversed version. This result is a significant improvement over some widely-used known techniques such as second harmonic FROG, which cannot differentiate a pulse from its time-reversed replica, and hence requires additional information regarding the pulse to lift this ambiguity.

Figure 11:
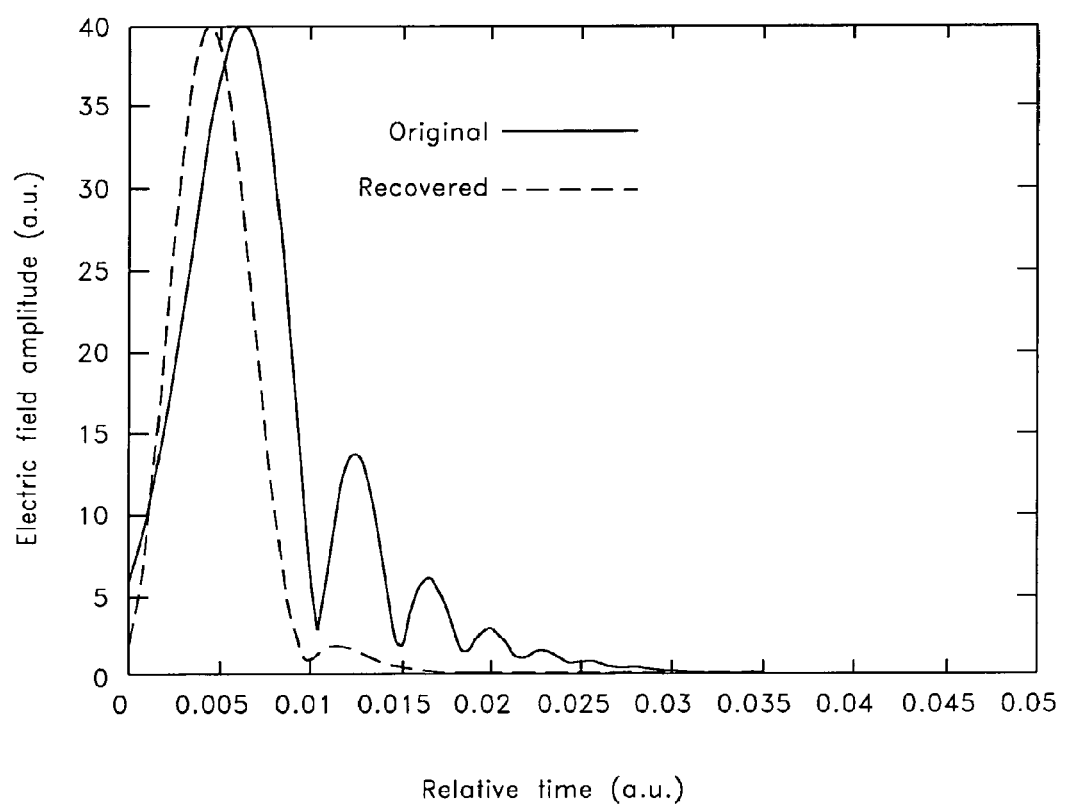
FIG. 11 is a plot of the complex electric field temporal profiles of the original dummy pulse of FIG. 9A (solid line) and the recovered dummy pulse (dashed line).

In certain embodiments, the dummy pulse 224 is generally not recovered well, which is of course inconsequential. FIG. 11 illustrates this behavior by showing the original magnitude of the dummy pulse used in the recovery of FIG. 2 (solid line, reproduced from FIG. 1A) and the recovered magnitude of the dummy pulse (dashed line). Most of the significant features of the original dummy temporal profile, such as the oscillations in the tail, are washed out in the recovered dummy pulse temporal profile. This behavior is expected in certain embodiments in which the pulse sequence approximates an MPF, but does not equal a true MPF. Consequently, certain embodiments described herein which converges to a true MPF produce a recovered pulse sequence that differs from the original pulse sequence. As shown by FIG. 11, almost all of the differences between the recovered pulse sequence and the original pulse sequence occur around the first dominant peak (i.e., the dummy pulse 224). This feature is due to the minimum phase condition being strictly related to the dummy pulse's shape and magnitude. Specifically, for a function to be a true MPF, the rise time of its dominant peak at the origin (e.g., t=0) is very sharp. Since this condition cannot be met perfectly with practical dummy pulses in the laboratory, the constructed pulse sequence only approximates a true MPF and is not a true MPF. On the other hand, the shape of the sample pulse 202 has little bearing on whether the pulse sequence is a true MPF. In a simplistic view, the inconsequential recovery of the dummy pulse is sacrificed to achieve a very accurate recovery for the weaker sample pulse or pulses.

Figure 12:
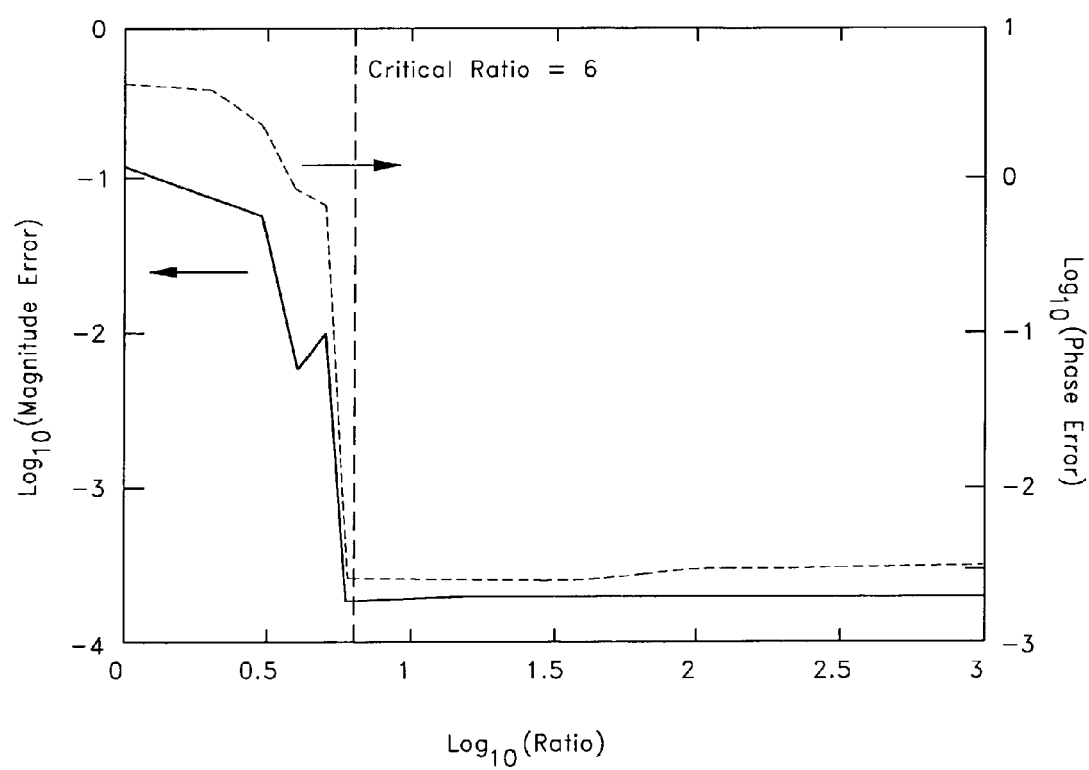
FIG. 12 is a log-log plot of the error in the recovered electric field magnitude and phase as functions of the ratio of the peak magnitude of the dummy pulse to that of the sample pulse.

In certain embodiments, the parameter that influences the accuracy of the recovery most strongly is the magnitude of the dummy pulse 224 as compared to the magnitude of the sample pulse 202. For the recovery results shown in FIG. 2, the ratio of the dummy pulse magnitude to the sample pulse magnitude (referred to herein as the magnitude ratio) was chosen to equal 40. FIG. 12 is a plot of the logarithm of the errors in the recovered magnitude and phase (as compared to the original magnitude and phase) for the optical pulses of FIGS. 9A and 9B as a function of the logarithm of the magnitude ratio. The error plotted in FIG. 12 was defined as $$\frac{\int |f(t) - \hat{f}(t)|^2 dt}{\int |f(t)|^2 dt},$$

where f(t) and $\hat{f}(t)$ are the original and the recovered quantities, respectively, and where the integrals were calculated over the time duration of the sample pulse only. FIG. 12 demonstrates that for embodiments with a magnitude ratio of approximately 6 or greater, the error in both the recovered phase and the recovered magnitude drops dramatically as compared to embodiments with a magnitude ratio less than approximately 6. Above a magnitude ratio of approximately 6, the error is roughly constant and less than approximately $2 \times 10^{-4}$. The magnitude ratio at which the large reduction of the error is observed (e.g., the critical ratio) depends on the functional form of both the sample pulse and the dummy pulse, and it typically ranges between approximately 5 and approximately 15. In certain embodiments, the dummy pulse is selected to provide a magnitude ratio greater than approximately 20, while in other embodiments, the dummy pulse is selected to provide a magnitude ratio greater than approximately 30. In certain embodiments, the convergence of the method can be checked by carrying out the spectral measurement for two values of the magnitude ratio (e.g., 25 and 50), and determining that the difference between the two solutions is negligible. FIG. 12 also illustrates that the recovery remains equally good with magnitude ratios as large as 1000. Such large magnitude ratios can be used in the determination of ultra-weak optical pulses. Certain embodiments described herein characterize a temporal profile of an ultrashort pulse that is at least 1 million times weaker in peak power than the leading dummy pulse.

Figure 13:
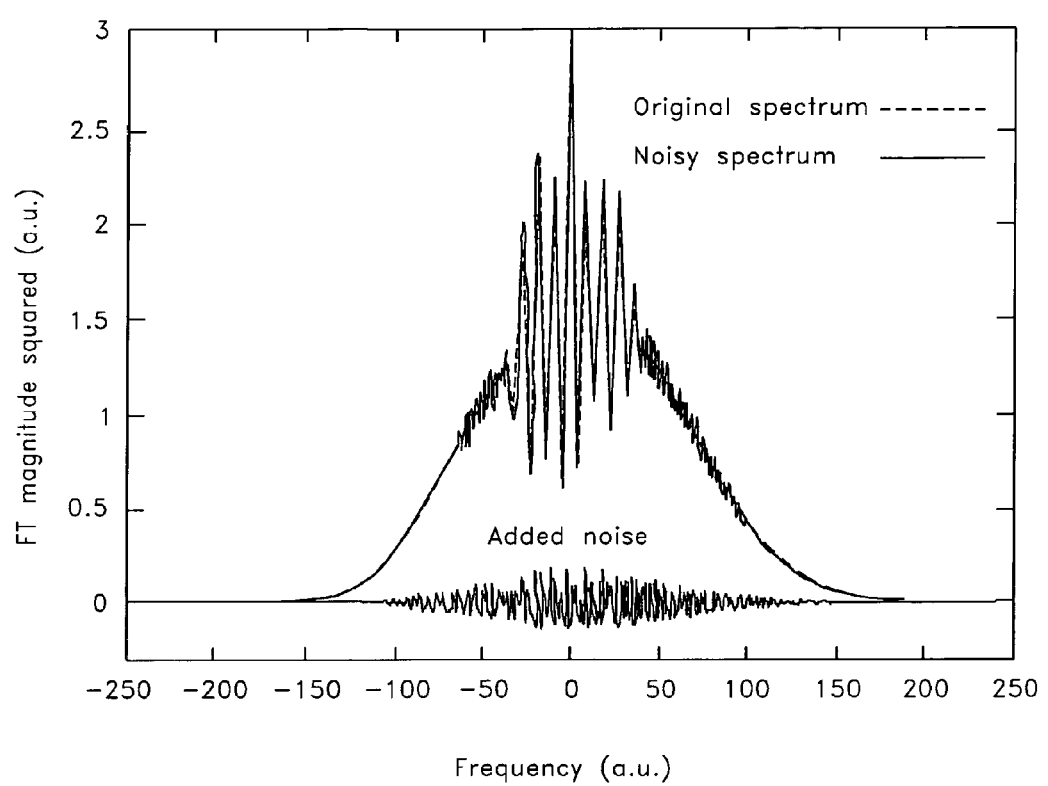
FIG. 13 is a plot of a simulated noisy power spectrum (solid line) and a simulated noise-free power spectrum (dashed line).
Figure 14A:
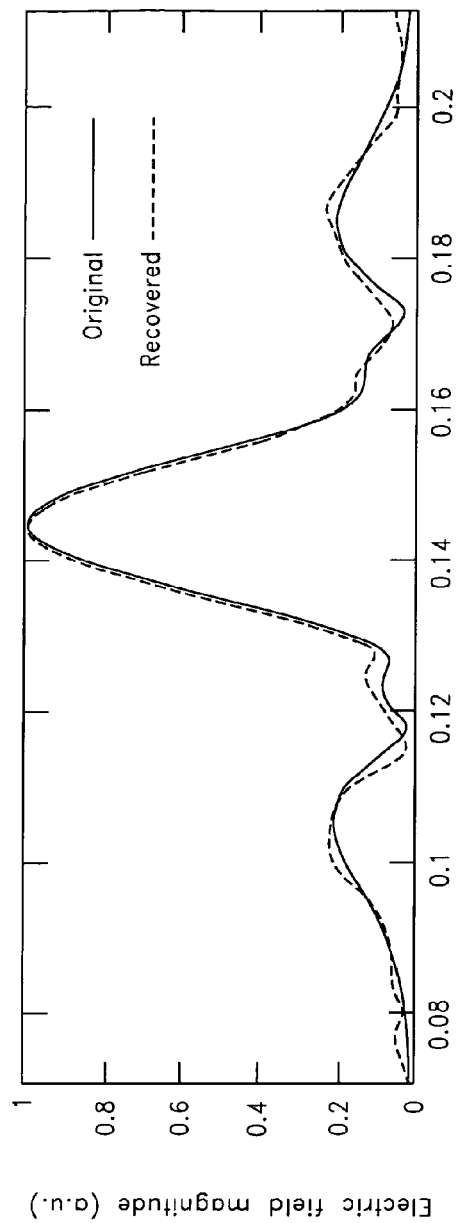
FIGS. 14A and 14B are plots of the magnitude and phase, respectively, of the original complex electric field temporal profile (solid lines) and the recovered complex electric field temporal profile (dashed lines) recovered by applying an exemplary embodiment to the noisy power spectrum of FIG. 13.
Figure 14B:
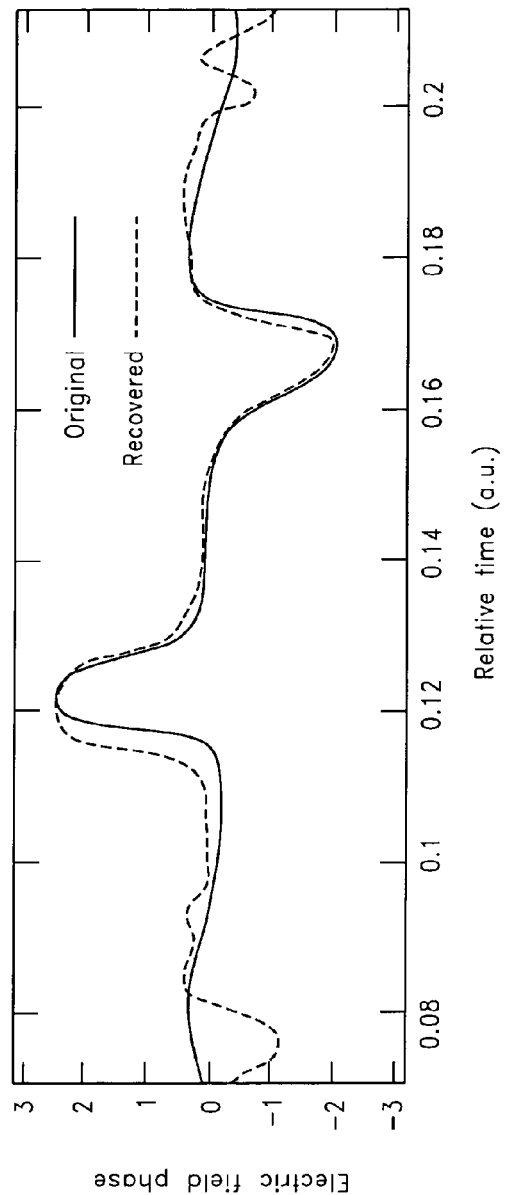

In certain embodiments, errors and noise in the measured power spectrum affect the accuracy of the recovered temporal profiles. A simulated noise-free measured original power spectrum, plotted in FIG. 13 (dashed curve), was calculated by taking the square of the theoretical FT magnitude of an arbitrary dummy-sample pulse sequence with a peak magnitude ratio of 13. A simulated noisy measured power spectrum, plotted in FIG. 13 (solid curve), was calculated by multiplying the noise-free power spectrum by a uniform random noise with a 20% peak-to-peak amplitude and an average of unity. FIGS. 14A and 14B are plots of the magnitude and phase, respectively, of the two recovered temporal profiles obtained by applying the SIMBA method to each of the spectra of FIG. 13. The solid lines of FIGS. 14A and 14B correspond to the recovered temporal profile corresponding to the noise-free power spectrum of FIG. 13, and the dashed lines of FIGS. 14A and 14B correspond to the recovered temporal profile corresponding to the noisy power spectrum of FIG. 13. The recovery is still quite good in spite of the large measurement noise, with the mean error in the recovered pulse intensity less than 1.5%. Simulations also show that the mean error in the recovered temporal profile is proportional to the error in the power spectrum. Such results illustrate that certain embodiments described herein work well even with fairly noisy power spectrum measurements. The noise sensitivity is affected by the magnitude ratio of the dummy pulse to the sample pulse. In certain embodiments in which the main source of noise in the OSA measurement system is proportional to the input power, as assumed above, an increase in the magnitude of the dummy pulse results in a larger amount of noise in the measured power spectrum, and a larger error in the recovered sample pulse temporal profile. To maximize the accuracy of the recovered temporal profile in the presence of noisy power spectrum measurements, certain embodiments advantageously select a magnitude ratio close to the critical ratio (e.g., in a range between approximately 5 and approximately 15). For example, the magnitude ratio corresponding to FIG. 13 was selected to be 13, which advantageously facilitates both accurate convergence of the iterative method and reduced sensitivity to measurement noise.

The accuracy of certain embodiments described herein is also affected by the frequency bandwidths of the dummy pulse and the sample pulse. In certain embodiments, the frequency bandwidth of a pulse is defined to be the full width of the FT spectrum magnitude at 10% of its maximum value. In the numerical example illustrated by FIGS. 10A and 10B, the frequency bandwidth of the dummy pulse is approximately 4.5 times that of the sample pulse (i.e., a frequency bandwidth ratio of approximately 4.5). This can be seen as well in the power spectrum of FIG. 1B, where the narrow band in which the interference fringes occur represents roughly the frequency range of the narrower sample pulse.

Figure 15A:
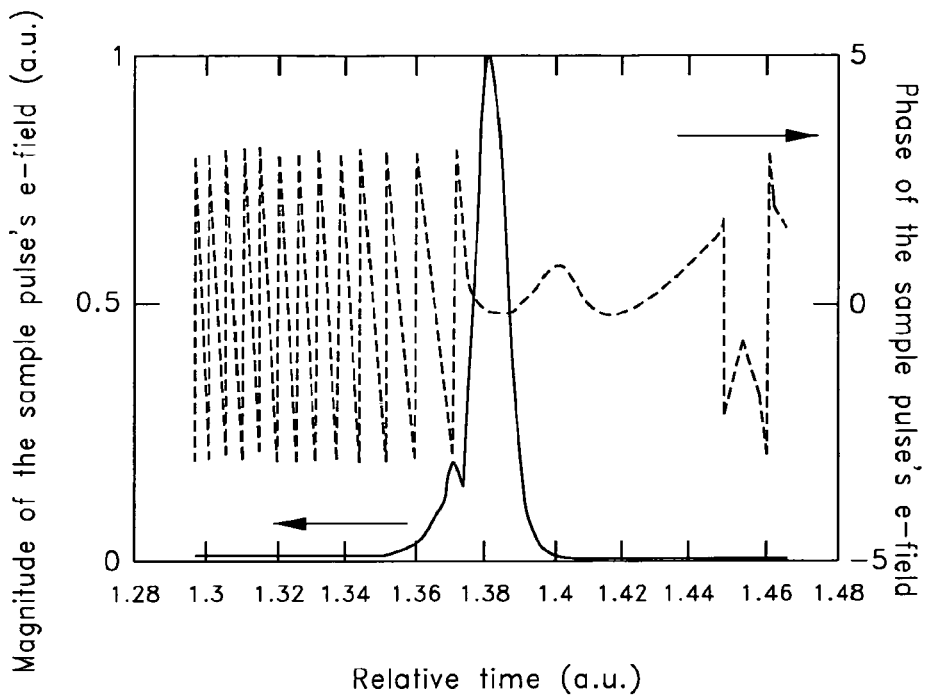
FIG. 15A illustrates an exemplary sample pulse with the magnitude shown as a solid line and the phase shown as a dashed line.
Figure 15B:
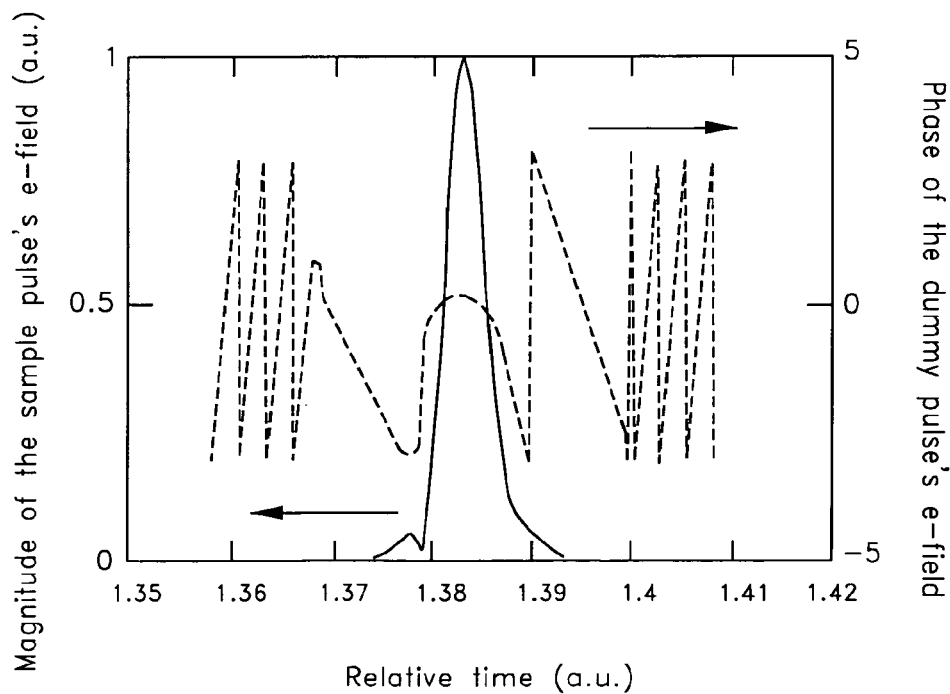
FIG. 15B illustrates an exemplary dummy pulse which is temporally narrower than the sample pulse of FIG. 15A with the magnitude shown as a solid line and the phase shown as a dashed line.

FIGS. 15A and 15B are plots of the sample pulse and the dummy pulse, respectively, with a frequency bandwidth ratio of approximately 2. The solid lines of FIGS. 15A and 15B correspond to the pulse magnitudes, and the dashed lines of FIGS. 15A and 15B correspond to the pulse phases. In this numerical example, the temporal width of the dummy pulse is chosen to be approximately 2.4 times more narrow than the temporal width of the sample pulse, as illustrated by FIGS. 15A and 15B.

Figure 16A:
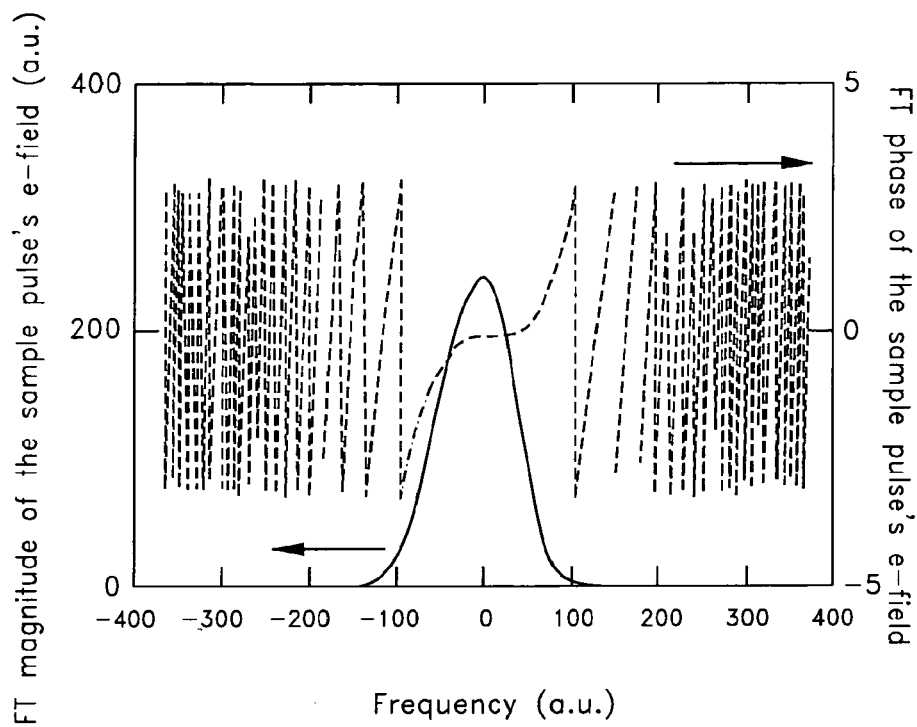
FIG. 16A illustrates the calculated magnitude (solid line) and phase (dashed line) of the Fourier transform spectrum of the sample pulse of FIG. 15A.
Figure 16B:
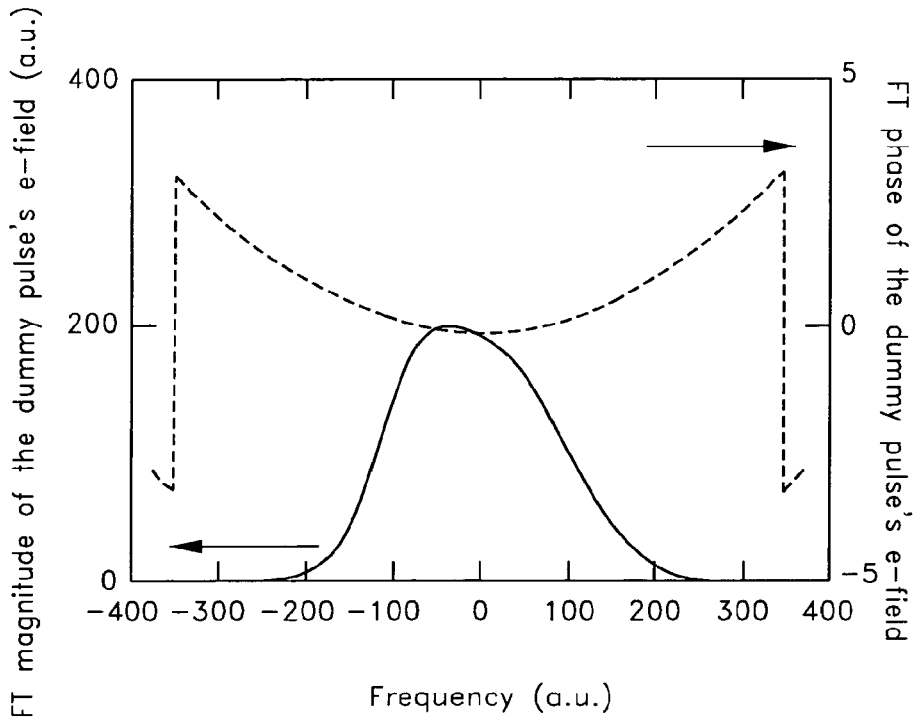
FIG. 16B illustrates the calculated magnitude (solid line) and phase (dashed line) of the Fourier transform spectrum of the dummy pulse of FIG. 15B.

FIGS. 16A and 16B are plots of the FT spectra of the sample pulse and the dummy pulse, respectively, of FIGS. 15A and 15B, with solid lines corresponding to FT magnitudes and dashed lines corresponding to FT phases. The FT spectra of FIGS. 16A and 16B include strong third-order and second-order phases, respectively. In contrast, in the example illustrated by FIGS. 10A and 10B, the sample pulse of FIG. 10A and the dummy pulse of FIG. 10B included strong second-order and third-order phases, respectively. As a result, the temporal profiles of the two pulses of FIGS. 15A and 15B are quite different from those of FIGS. 9A and 9B discussed above. As used herein, the term "second-order phase" refers to the term of the phase that is proportional to the square of the normalized optical frequency and the term "third-order phase" refers to the term of the phase that is proportional to the cube of the normalized optical frequency.

Figure 17A:
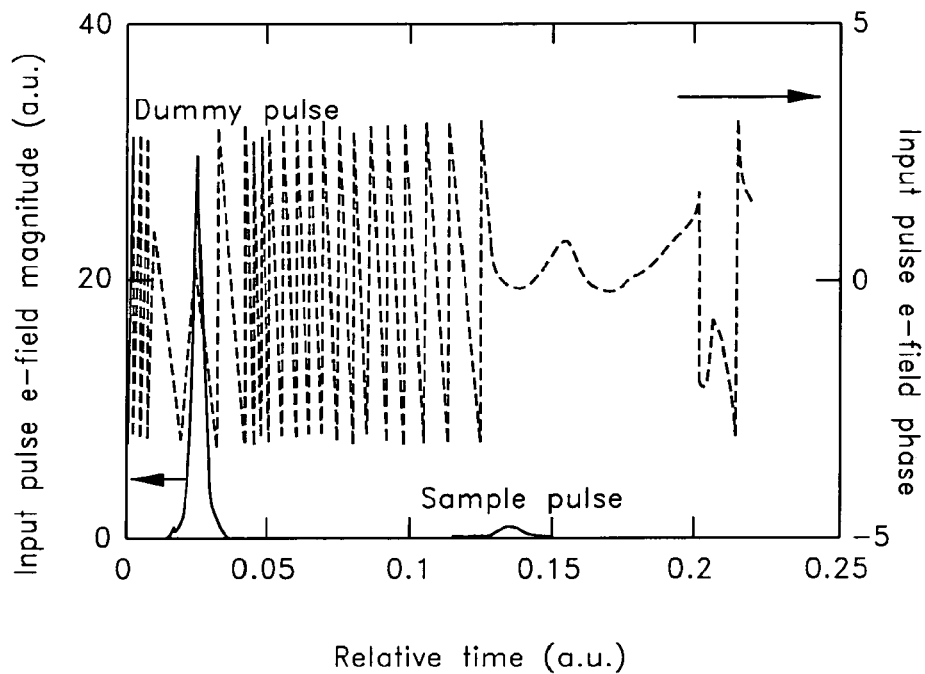
FIG. 17A is a plot of the complex electric field temporal profile (magnitude and phase shown by solid and dashed lines, respectively) of a pulse sequence formed by delaying a sample pulse in time with respect to a stronger dummy pulse.
Figure 17B:
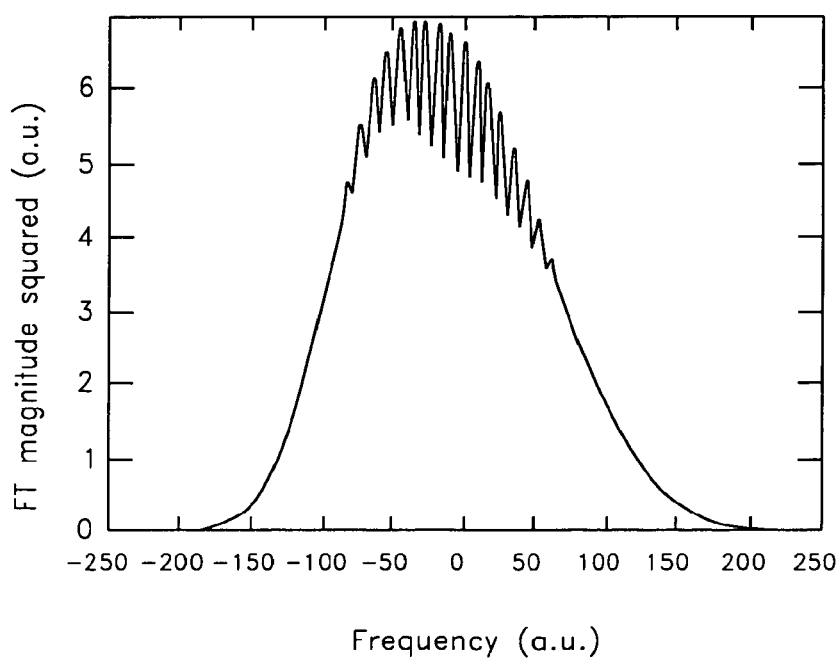
FIG. 17B is a plot of the power spectrum (i.e., square of the Fourier transform magnitude) of the complex electric field temporal profile of FIG. 17A.

FIG. 17A illustrates the electric field of a pulse sequence formed by delaying the sample and dummy pulses of FIGS. 15A and 15B. In the pulse sequence of FIG. 17A, the magnitude ratio of the two pulses was chosen to be 30. The computed square of the FT magnitude of this pulse sequence is shown in FIG. 17B. The sample pulse recovered by applying an embodiment of the SIMBA method to FIG. 17B, shown by the dashed lines of FIG. 18, is again in very good agreement with the original pulse, shown by the solid lines of FIG. 18. This result demonstrates that a frequency bandwidth ratio of approximately 2 is still high enough for a reliable recovery.

However, reducing the frequency bandwidth ratio much further (e.g., to less than 1) would introduce a noticeable error in the recovered temporal profile. This behavior is explained by observing that if the frequency bandwidth of the dummy pulse is narrower than the frequency bandwidth of the sample pulse, then some of the high frequency components in the FT magnitude spectrum (e.g., see FIGS. 1B and 17B) will be missing. Since these high-frequency oscillations carry information regarding the sample pulse, the sample pulse will not be faithfully recovered from the FT magnitude spectrum. For the recovery to be accurate, a minimum frequency bandwidth ratio of greater than 1 (e.g., 2 or more) is advantageously used in certain embodiments.

The minimum frequency bandwidth selection is not specific to certain embodiments of the method described herein. Most other SI techniques also utilize a reference pulse with a broader frequency spectrum than the ultrashort pulses to be characterized. Note that with certain embodiments described herein, there is no maximum frequency bandwidth ratio requirement. In certain embodiments, the dummy pulse frequency bandwidth can be as much as 1000 times wider than the sample pulse frequency bandwidth. In practice, the maximum dummy pulse bandwidth will be imposed by the available laser. In certain embodiments, a dummy pulse with a sufficient frequency bandwidth (e.g., about twice the frequency bandwidth of the sample pulse) can be easily obtained by compressing a longer pulse (e.g., the sample pulse itself) using one of many pulse compression techniques available in the prior art (see, e.g., M. Nisoli et al., "*Generation of high energy 10 fs pulses by a new pulse compression technique*," Appl. Phys. Lett., Vol. 68, pp. 2793-2795 (1996); M. A. Arbore et al., "*Engineerable compression of ultrashort pulses by use of second-harmonic generation in chirped-period-poled lithium niobate*," Opt. Lett., Vol. 22, pp. 1341-1342 (1997)).

Figure 18:
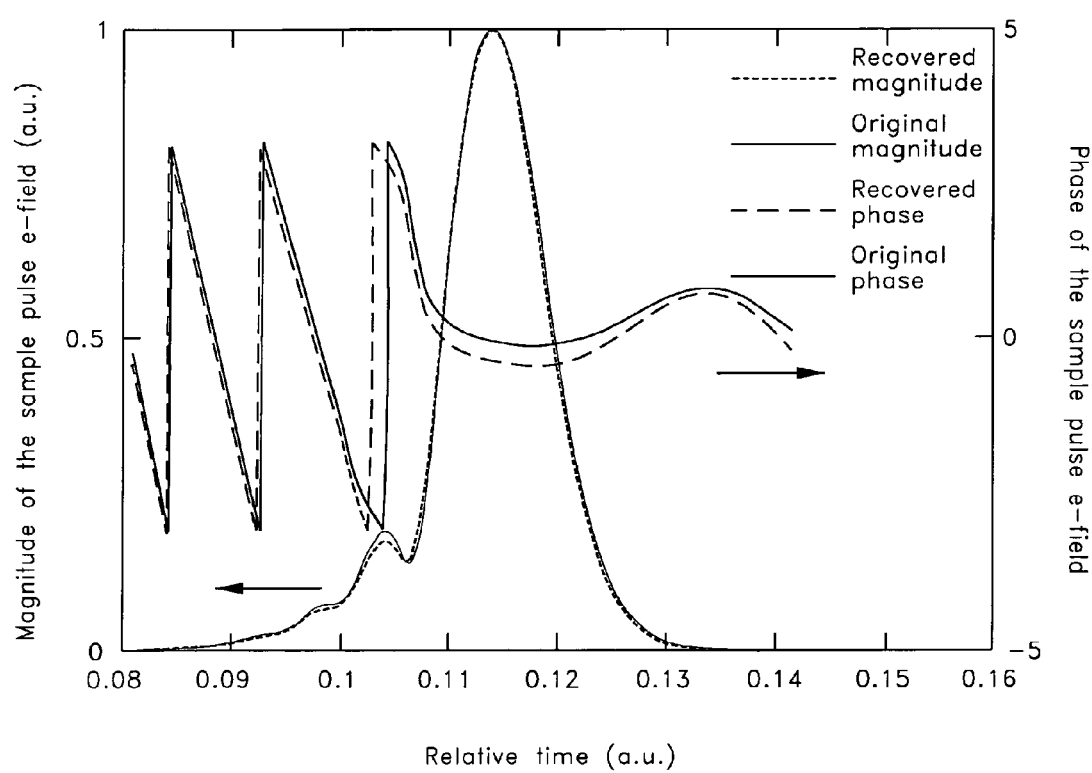
FIG. 18 is a plot of the original complex electric field temporal profile of FIG. 17A (solid lines) and a recovered complex electric field temporal profile (dashed lines) recovered using an exemplary embodiment from the power spectrum of FIG. 17B.

As shown in FIG. 18, there is a slight dc offset between the recovered and original phase spectra. This offset corresponds physically to the relative phase of the electric-field oscillations under the complex electric-field envelope e(t). For many applications, this offset is inconsequential and previously-existing techniques also cannot recover this dc phase component.

Figure 19A:
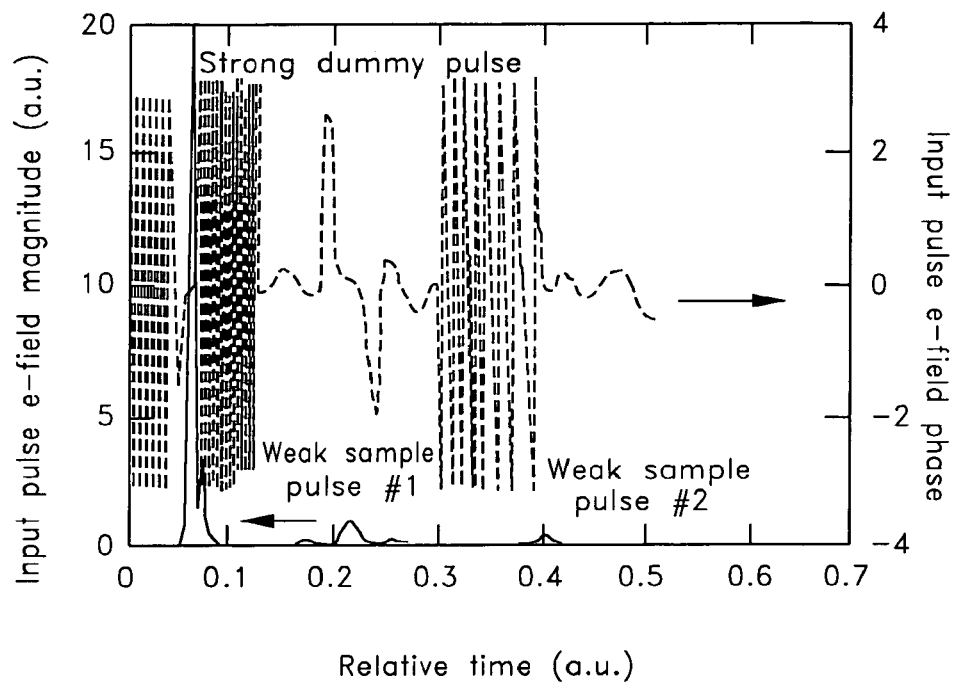
FIG. 19A is a plot of the complex electric field temporal profile (magnitude and phase shown by solid and dashed lines, respectively) of a pulse sequence formed by a dummy pulse and two sample pulses.
Figure 19B:
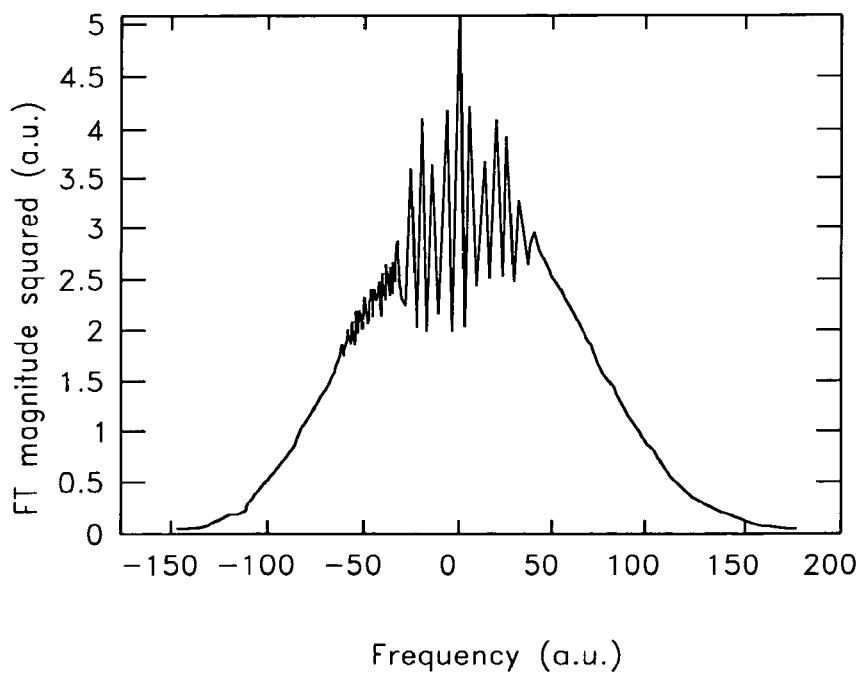
FIG. 19B is a plot of the power spectrum (i.e., square of the Fourier transform magnitude) of the complex electric field temporal profile of FIG. 19A.
Figure 20:
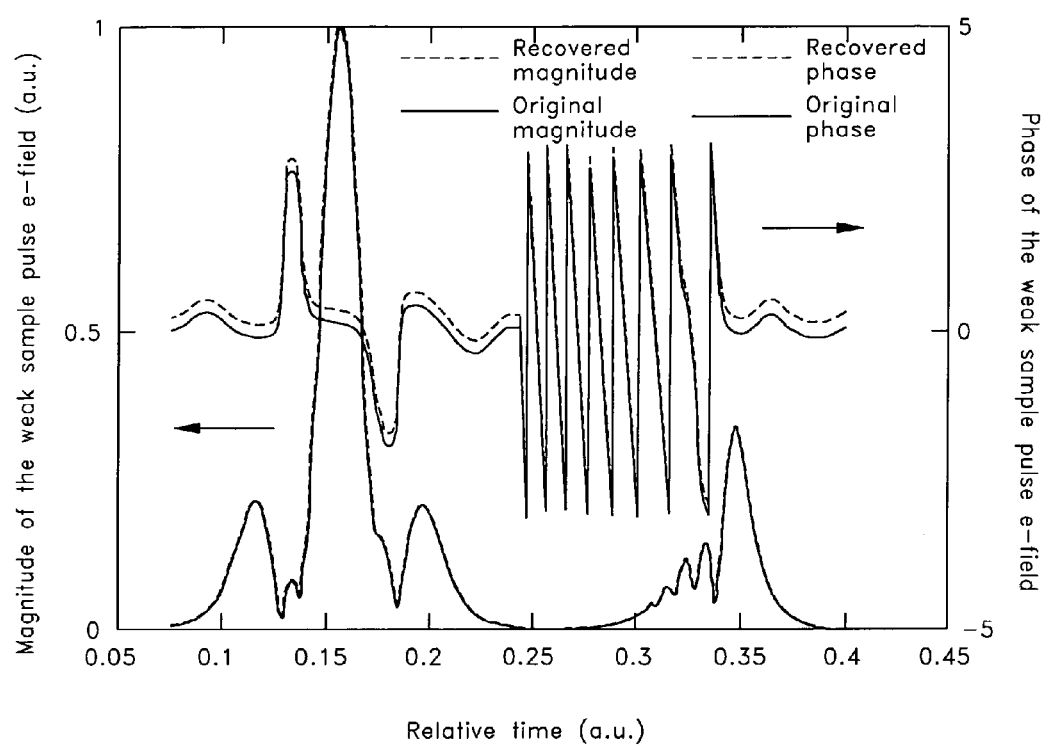
FIG. 20 is a plot of the original complex electric field temporal profile of FIG. 19A (solid lines) and a recovered complex electric field temporal profile (dashed lines) recovered using an exemplary embodiment from the power spectrum of FIG. 19B.

Certain embodiments described herein use a single power spectrum measurement to advantageously characterize the complex electric field profile of a series of sample laser pulses (as might be generated for example by multiple laser sources). FIG. 19A illustrates an exemplary series of a single dummy pulse and two sample pulses formed by delaying two different ultrashort laser pulses. The single dummy pulse in FIG. 19A is chosen to be the same as that in FIG. 9B. The relative maximum electric field magnitudes of the dummy pulse, the first sample pulse, and the second sample pulse of FIG. 19A were chosen to be 20, 1 and $\frac{1}{3}$, respectively. The recovery results were independent of these relative magnitudes. For example, relative magnitudes of 40, 1, 1 and 30, 1, $\frac{1}{2}$, gave similar results. FIG. 19B illustrates the computed square of the FT magnitude of the complex temporal profile of FIG. 19A. Applying the same iterative error-reduction method as before to the measured power spectrum of FIG. 19B simultaneously recovers the complex electric field temporal profile of both sample pulses, as shown by the dashed curves of FIG. 20. The recovery is as accurate as in the previous examples described above. Thus, certain embodiments advantageously recover simultaneously the full complex electric field temporal profiles of two different ultrashort pulses using a single power spectrum measurement. Equally accurate recoveries are obtained when the two sample pulses have different temporal profiles. There is again a small inconsequential dc offset in the recovered phase spectrum. In the time interval between the two sample pulses, the error in the recovered phase spectrum is simply due to the fact that the magnitude of the electric field in that interval is very close or equal to zero, as discussed earlier.

Certain embodiments described herein can advantageously characterize pulse sequences containing many more than two individual sample pulses. However, when the number of sample pulses is too large, the oscillations in the FT magnitude arising from multiple interference between the sample pulses becomes so rapid that a higher resolution OSA is used to measure the power spectrum. Therefore, the number of sample pulses that can be simultaneously characterized depends on the resolution of the OSA.

In certain embodiments, various ultrashort pulse shaping techniques (see, e.g., M. M. Wefers and K. A. Nelson, "*Analysis of programmable ultrashort waveform generation using liquid-crystal spatial light modulators*," J. Opt. Soc. Am. B, Vol. 12, pp. 1343-1362 (1995); A. Rundquist et al., "*Pulse shaping with the Gerchberg-Saxton algorithm*," J. Opt. Soc. Am. B, Vol. 19, pp. 2468-2478 (2002)) can be used to modify the temporal profile of the dummy pulse in order to achieve an absolutely true MPF for the pulse sequence's electric field. Certain such embodiments can potentially have a dramatically improved recovery speed. In principle, by using a true MPF, certain embodiments described herein can converge in less than 5 iterations, thus cutting down the computation time to a fraction of a second, even when using a relatively slow programming environment such as MATLAB® 5, a computer software package for matrix calculations.

Figure 21:
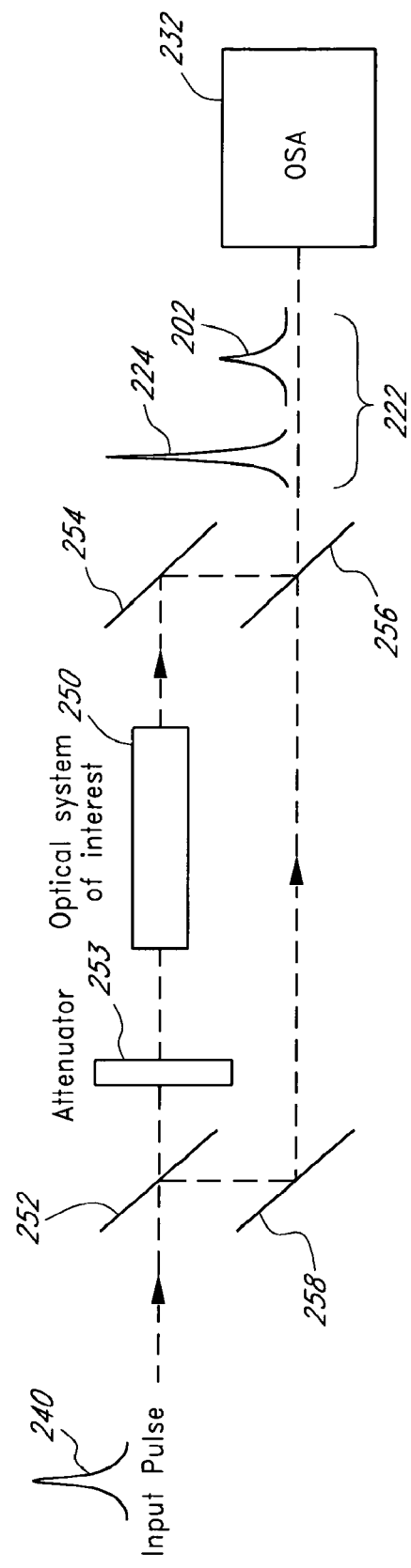
FIG. 21 schematically illustrates an example measurement configuration compatible with certain embodiments described herein.

FIG. 21 schematically illustrates an example measurement configuration compatible with certain embodiments described herein and used in the following two example measurements. A femtosecond laser (not shown) is used to produce an input pulse 240 to characterize an output sample pulse 202 that results from the interaction of the input pulse 240 with an optical system 250 of interest. A first portion of the intensity of the input pulse 240 is transmitted through a mirror 252 and an attenuator 253 to interact with the optical system 250 of interest. The resultant sample pulse 202 is then reflected by two mirrors 254, 256 and sent to the optical spectrum analyzer 232. A second portion of the intensity of the input pulse 240 is reflected by the mirror 252 and the mirror 258 and is transmitted through the mirror 256 and sent to the optical spectrum analyzer 232 and serves as the dummy pulse 224. The combination of the sample pulse 202 and the dummy pulse 224 creates a pulse sequence 222.

The mechanical stability of the measurement configuration was much less than one micron, which directly means that the delay jitter in the measurements would be lower than one femtosecond. In addition, the measurement equipment was kept at room temperature such that the measurements were far away from being shot-noise limited. However, the measurement configuration was able to recover the sample pulse complex electric field profiles quite reliably.

Example 1

In the first example, the optical system 250 of interest comprised a slab of fused silica approximately 16 centimeters long. Thus, the measurement of this first example can be considered to be a material characterization measurement. The input pulse 240 had a full-width-at-half-maximum width of approximately 145 femtoseconds, and was generated from a Ti:sapphire oscillator that ran at approximately 859 nanometers with a repetition rate of approximately 96 MHz. The peak powers of the dummy pulse 224 and the sample pulse 202 were approximately 2.61 microwatts and 168 nanowatts, respectively, which corresponds to a maximum field ratio of approximately 4.

Figure 22:
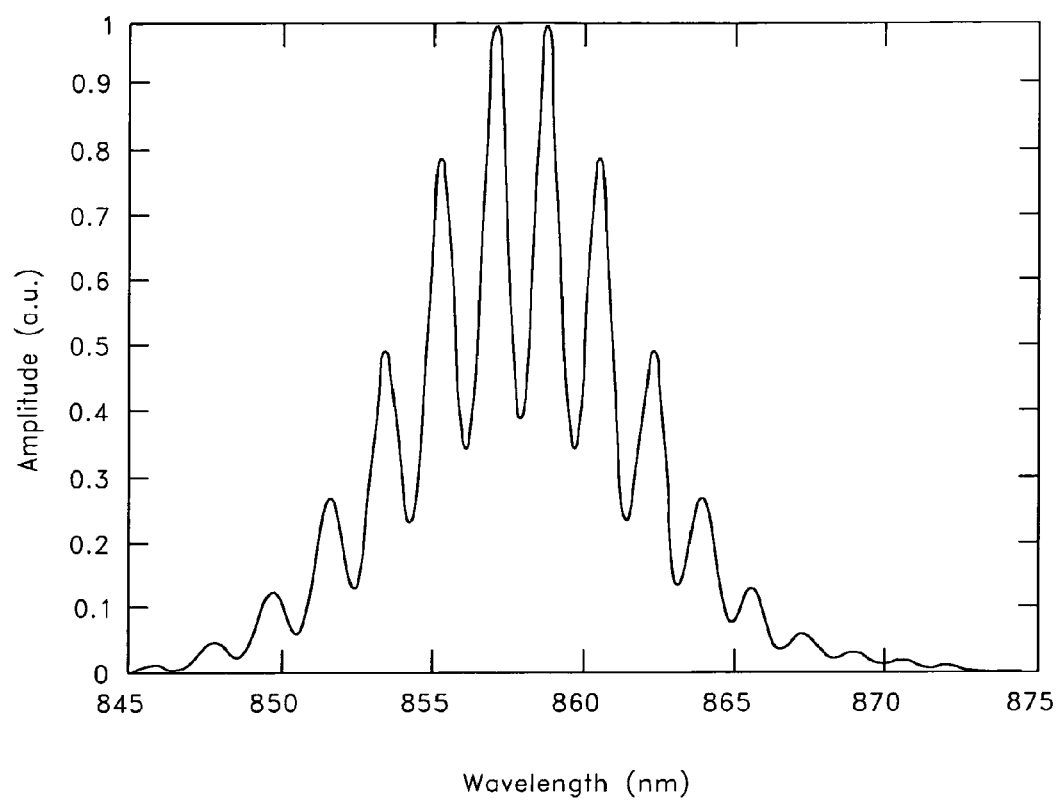
FIG. 22 is a graph of an example power spectrum of the pulse sequence formed by delaying the dummy pulse with respect to the sample pulse measured using the measurement configuration of FIG. 21.

FIG. 22 is a graph of the measured power spectrum of the pulse sequence 222 formed by delaying the dummy pulse 224 with respect to the sample pulse 202. Because fused silica has a large transparency window with $\chi^{(2)} \approx 0$, the bandwidth of the sample pulse 202 roughly matches that of the dummy pulse 224. Thus, the interference between the dummy pulse 224 and the sample pulse 202, as shown in the measured power spectrum of FIG. 22, occurs across the available bandwidth. The effect of the thick slab of fused silica is simply to broaden the sample pulse 202 with a strong second-order spectral phase, without affecting the bandwidth of the dummy pulse 224.

Figure 23A:
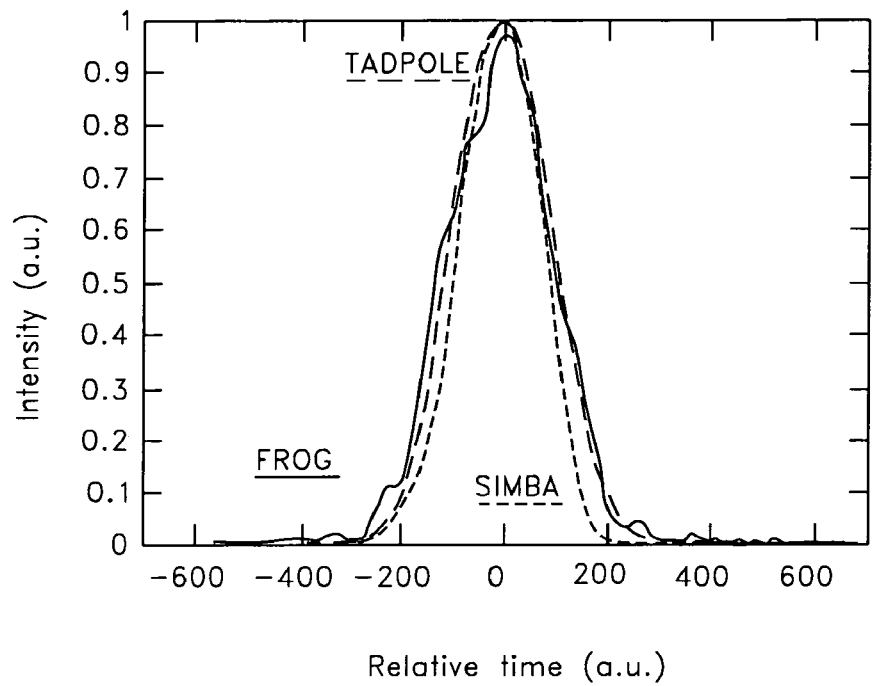
FIGS. 23A and 23B are graphs of the resulting intensity and phase, respectively, of the recovery after applying the technique disclosed herein to the square-root of the measured power spectrum shown in FIG. 22, as compared to the results of the recovery obtained using both the FROG technique and the TADPOLE technique.
Figure 23B:
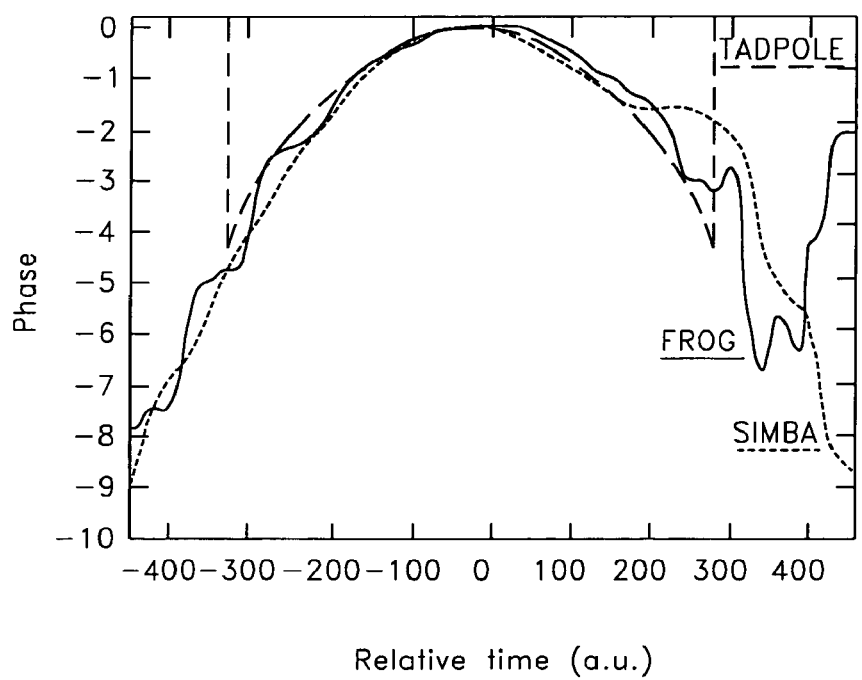

FIGS. 23A and 23B are graphs of the resulting intensity and phase, respectively, of the recovery after applying the SIMBA technique disclosed herein to the square-root of the measured power spectrum shown in FIG. 22. For comparison purposes, FIGS. 23A and 23B also include the results of the recovery obtained using both the FROG technique and the TADPOLE technique. The general agreement in the recovery results, for both the intensity and the phase of the electric field profile, obtained using the SIMBA, FROG, and TADPOLE techniques is very good. The recovery results of the TADPOLE technique, which also relies on the measured power spectrum shown in FIG. 22, involves two additional measurements: an initial full characterization of the dummy pulse 224 using a FROG configuration, and then an additional power spectrum measurement for the unknown sample pulse 202 alone. In contrast, the SIMBA technique only used the measured power spectrum shown in FIG. 22 for the recovery. In this example, the temporal FWHM of the dummy pulse 224 is only about 1.7 times more narrow than the FWHM of the sample pulse 202, and the recovery results obtained using the SIMBA technique are still quite good. In particular, the spectral phase, as shown in FIG. 23B, agrees very well with the phases obtained using the other techniques and with the predicted phase spectrum that can be theoretically computed using the known dispersion coefficients of fused silica. For the spectral phase recovery, after a certain range in which the intensity of the sample pulse 202 drops significantly, the phase curves obtained using the various techniques start to diverge from one another. This result is expected and is inconsequential.

Example 2

Figure 24A:
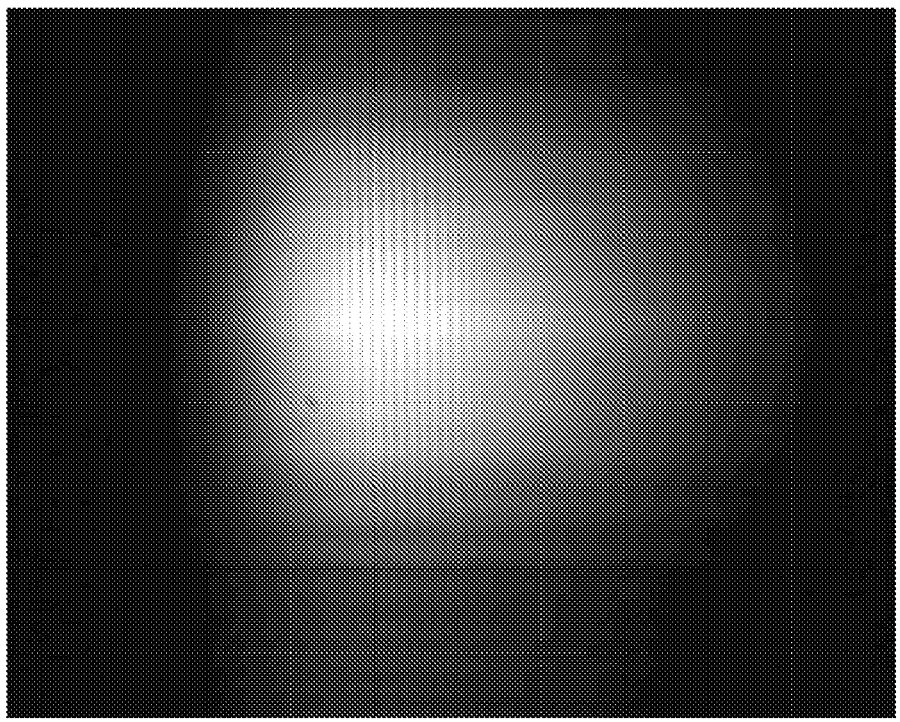
FIGS. 24A and 24B show recorded charge-coupled-device (CCD) images at the optical spectrum analyzer for two successive measurements with slightly different delay values between the sample pulse and the dummy pulse.
Figure 24B:
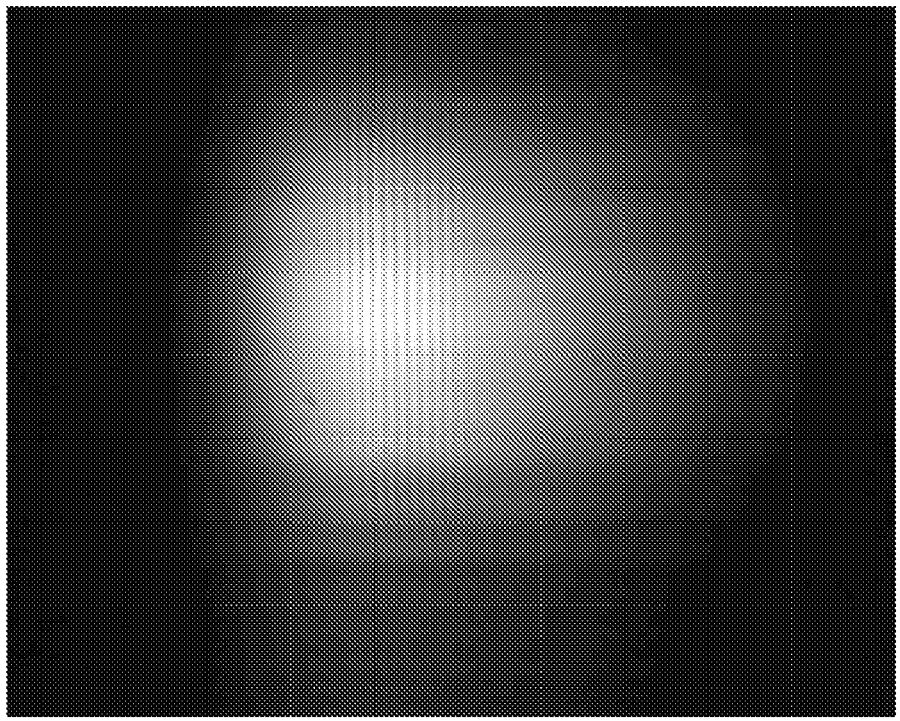

In this example, the optical system 250 of interest comprises a thin film bandpass filter, having a FWHM of approximately 10 nanometers, that significantly filters the frequency bandwidth of the dummy pulse 224. This spectral filtering resulted in a temporally wider sample pulse, while the dummy pulse 224 had a FWHM of about 30 femtoseconds. To test the repeatability of the SIMBA technique, using the measurement configuration of FIG. 21, two successive measurements were made with slightly different delay values between the sample pulse 202 and the dummy pulse 224. FIGS. 24A and 24B show recorded charge-coupled-device (CCD) images at the optical spectrum analyzer 232 for these two successive measurements. The resolution of the optical spectrum analyzer was about 54 picometers. For the measurement of FIG. 24A, a maximum field ratio between the dummy pulse 224 and the sample pulse 202 of about 4.40 was used and for the measurement of FIG. 24B, a maximum field ratio between the dummy pulse 224 and the sample pulse 202 of about 4.17 was used.

Figure 25A:
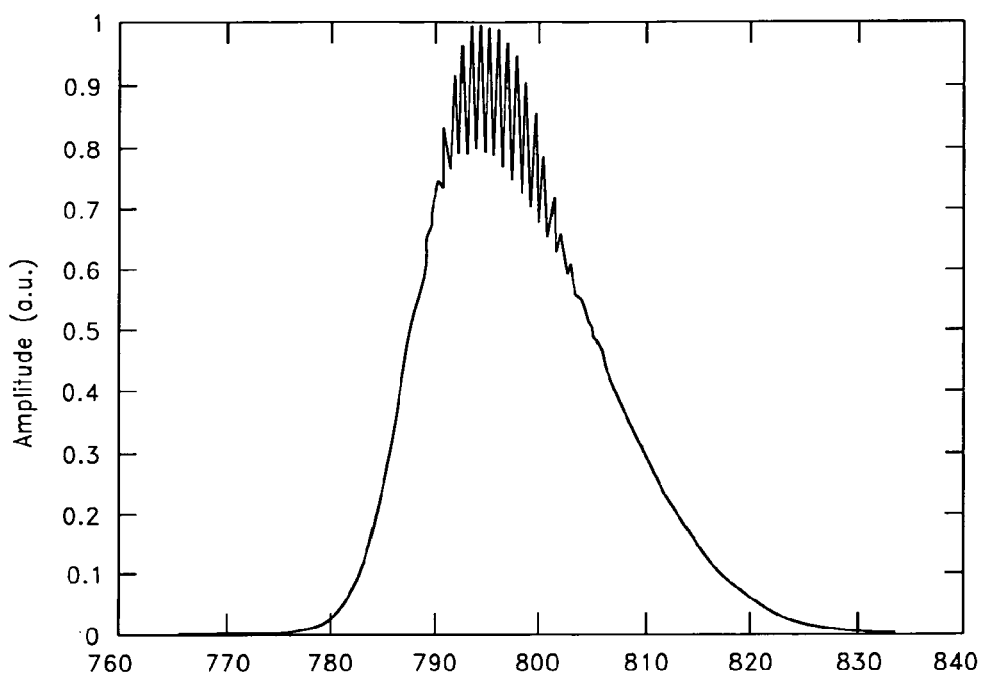
FIGS. 25A and 25B are plots of the measured power spectrum corresponding to the input pulse sequence obtained from FIGS. 24A and 24B, respectively, by adding the recorded spatial Fourier transform magnitude spectra along the vertical axis.
Figure 25B:
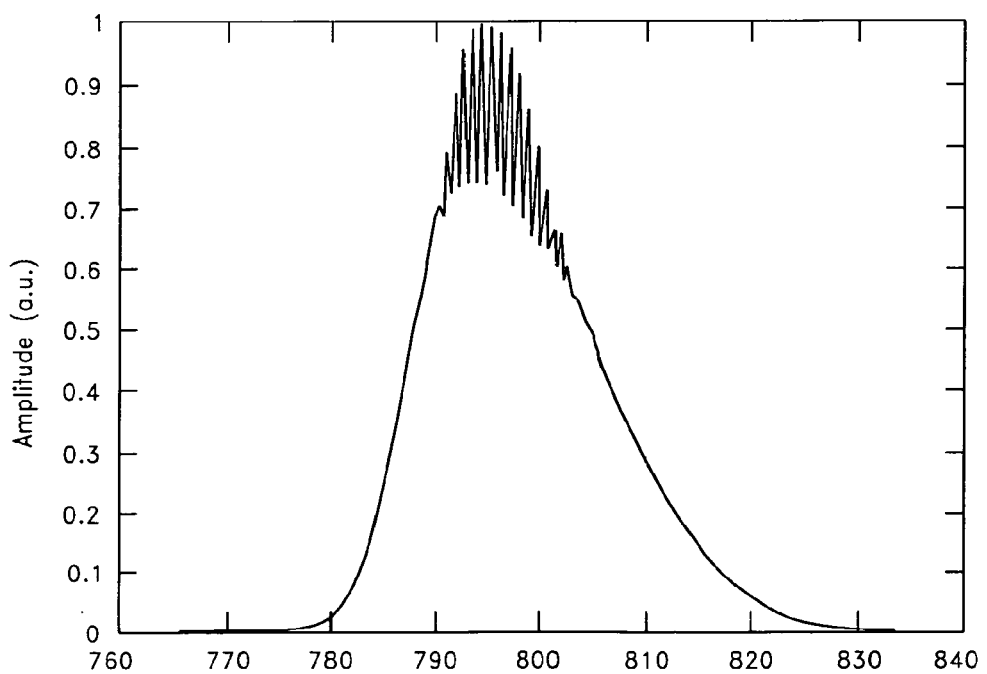

The recorded CCD images of FIGS. 24A and 24B are two-dimensional. Since the complex electric field profile of the pulses are one-dimensional, in principle, only an array of CCD pixels along a single line (e.g., along the x-direction) would be sufficient. However, to improve the signal-to-noise ratio in the measurement, a two-dimensional CCD array was used. FIGS. 25A and 25B are plots of the measured power spectrum corresponding to the input pulse sequence obtained from FIGS. 24A and 24B, respectively, by adding the recorded spatial Fourier transform magnitude spectra along the vertical axis.

A comparison of FIG. 22 with FIGS. 25A and 25B illustrates that the presence of the bandpass filter in Example 2 significantly reduces the bandwidth of the sample pulse 202. This bandwidth reduction results in the interference occurring only at the center region of the whole available bandwidth of the dummy pulse 224, as shown in FIGS. 25A and 25B.

Figure 26A:
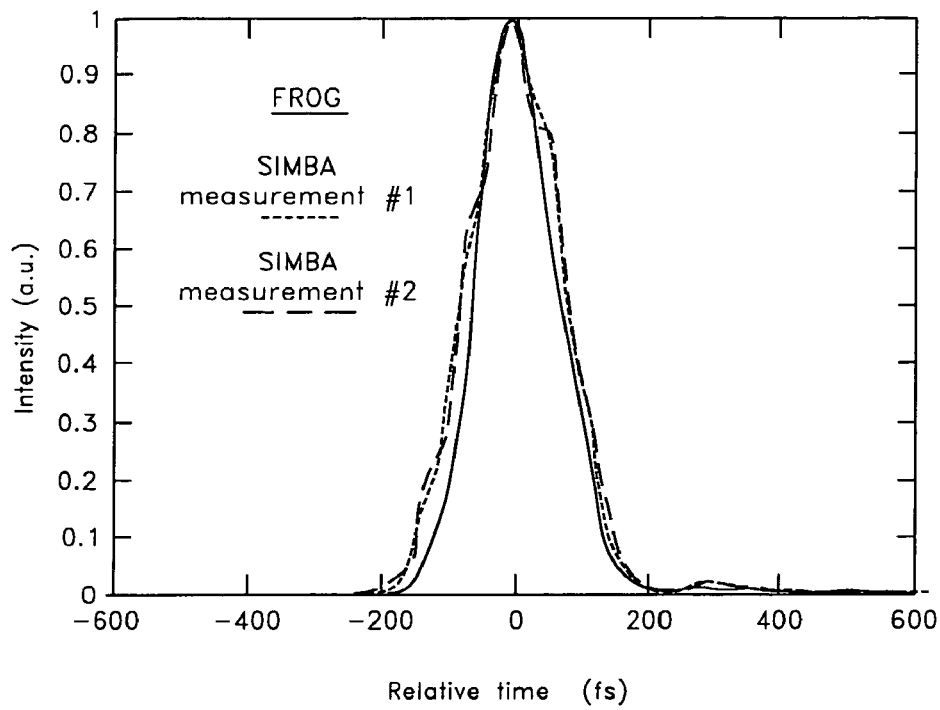
FIGS. 26A and 26B show the intensity and phase, respectively, of the electric field of the sample pulse recovered by applying the technique disclosed herein to the square-root of the measured power spectra of FIGS. 25A ("SIMBA measurement #1") and 25B ("SIMBA measurement #2"), as compared to the results of the FROG technique applied to the same sample pulse.
Figure 26B:
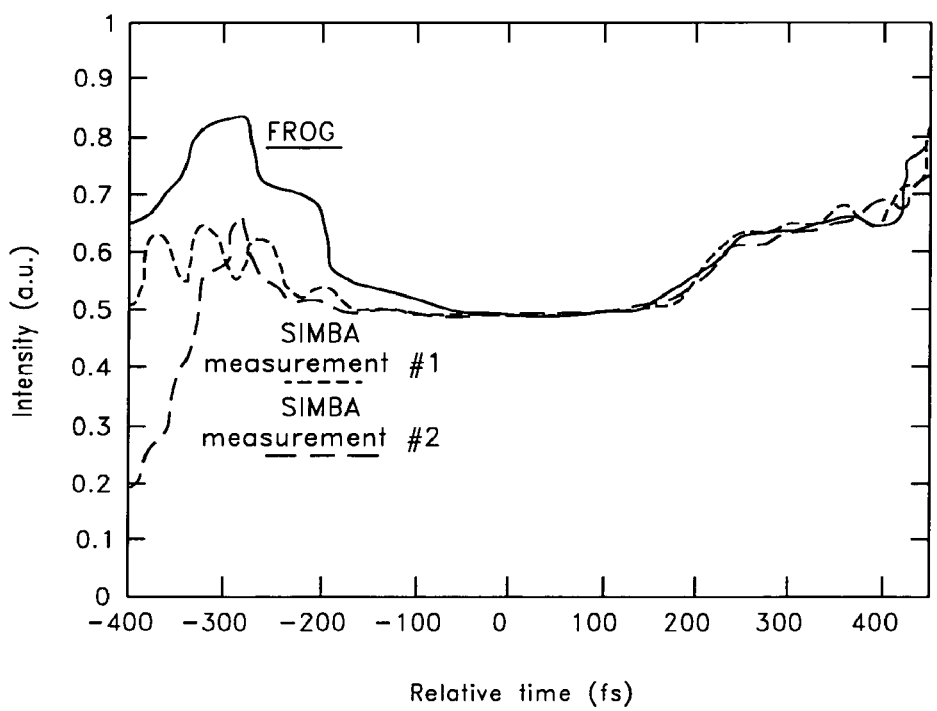

FIGS. 26A and 26B show the intensity and phase, respectively, of the electric field of the sample pulse 202 recovered by applying the SIMBA technique to the square-root of the measured power spectra of FIGS. 25A ("SIMBA measurement #1") and 25B ("SIMBA measurement #2"). For comparison purposes, FIGS. 26A and 26B also show the results of a FROG technique applied to the same sample pulse. The agreement between the results of the SIMBA technique and the FROG technique are quite good. The FROG technique used to produce the corresponding plots of FIGS. 26A and 26B was based on second-harmonic generation, and therefore had time reversal ambiguity in its result. This time reversal ambiguity is corrected by the SIMBA technique, such that FIG. 26A has the correct time axis. It is also noteworthy that both techniques reliably recovered the satellite pulse having a smaller amplitude between about 200 femtoseconds to about 400 femtoseconds. The physical origin of this satellite pulse is the spectral side lobes created by the bandpass filter used in this example. The observed discrepancy in the recovered phase spectra, especially for times less than about 200 femtoseconds, is simply due to a significant reduction of the pulse intensity. The consistency between the results of the SIMBA technique applied to the two successive measurements illustrates the repeatability of the SIMBA technique with different delay and maximum field ratios.

Optical Image Processing

MPFs are also applicable to the broad field of optical image processing. In particular, MPFs can be applied to simple optical systems that yield the Fourier transform (FT) of a two-dimensional complex transmission function of an object or image of interest.

Figure 27:
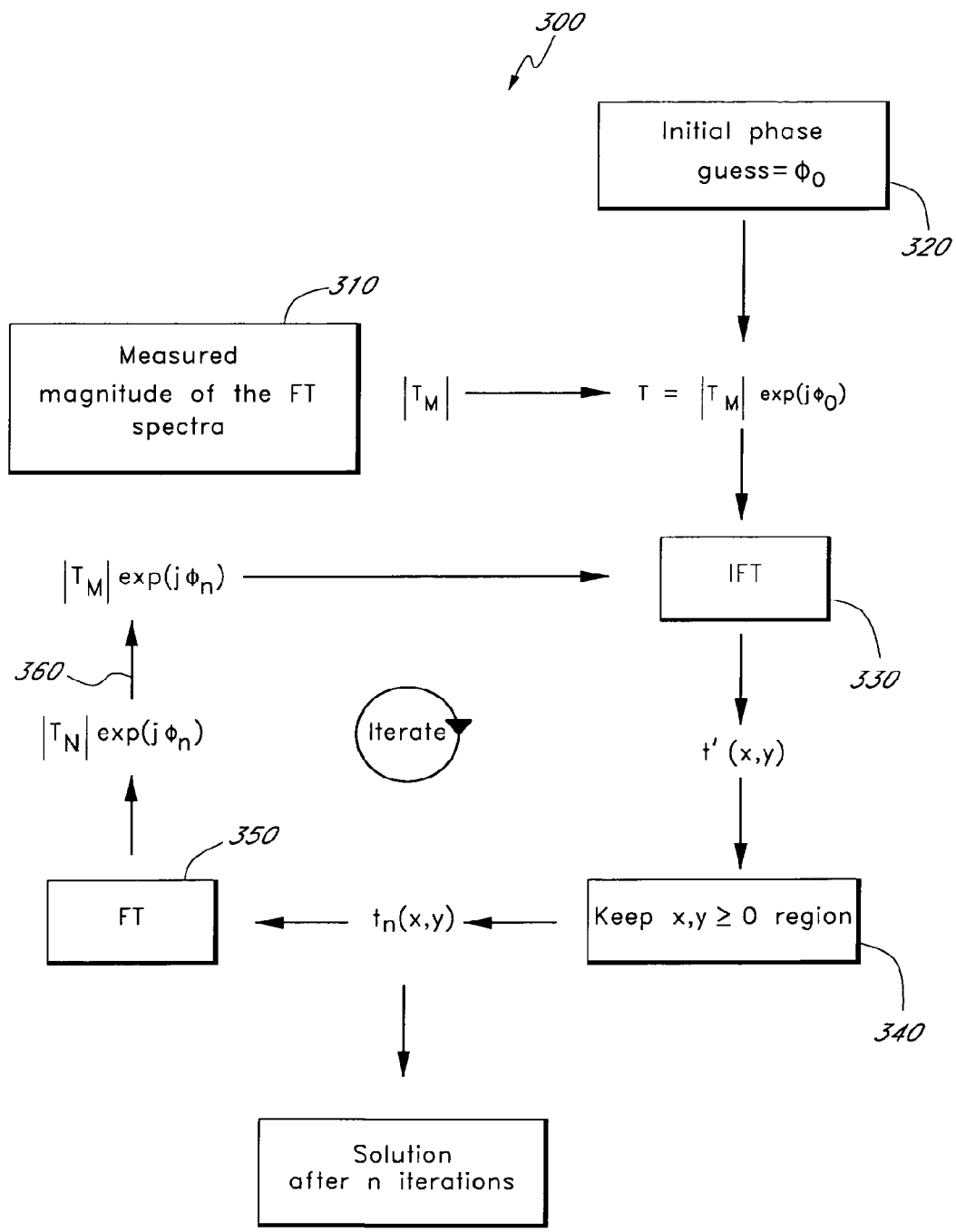
FIG. 27 is a flow diagram of an example iterative error-reduction method for optical image processing compatible with certain embodiments described herein.

FIG. 27 is a flow diagram of an example iterative error-reduction method 300 for optical image processing compatible with certain embodiments described herein. This iterative error-reduction 300 involves using a known (e.g., measured) Fourier transform magnitude of an unknown two-dimensional complex transmission function t(x, y), together with known properties of this function (e.g., that it is a real function or a causal function), to correct an initial guess of t(x, y). In certain embodiments, this correction is done iteratively. In certain embodiments, the unknown function t(x, y) comprises the complex transmission function of a composite structure, as described more fully below.

Given a complex two-dimensional MPF, t(x, y), the only quantity that is fed into the method 300 is the measured magnitude of the Fourier transform of t(x, y), i.e., $|T_M(f_x, f_y)|$, where the subscript M denotes that this spectrum is a measured quantity, as shown by the operational block 310. In certain embodiments, providing the measured magnitude of the FT comprises transmitting light through the composite structure, measuring a spatial frequency spectrum of the transmitted light, and calculating the square root of the measured spatial frequency spectrum to yield the measured magnitude $|T_M(f_x, f_y)|$.

In certain embodiments, the spatial frequency spectrum is a power spectrum. In certain other embodiments, the spatial frequency spectrum is a Fourier spectrum, a Fresnel spectrum, or a Franhaufer spectrum. For example, the Fresnel diffraction pattern intensity can also provide a spatial frequency spectrum. However, it is the FT spectrum of the image function modified by some phase factors. In certain embodiments, the Fresnel diffraction images may also be used, although the additional phase terms complicate the issue-recovery significantly.

In certain other embodiments, providing the measured magnitude of the FT comprises providing a previously-measured spatial frequency spectrum of light transmitted through the composite structure and calculating the square root of the previously-measured spatial frequency spectrum. In certain embodiments, the light comprises plane waves, while in certain other embodiments, the light comprises non-plane waves. Generally, the plane-wave approximation is easier to satisfy in the measurements, however, any source with known spatial properties may be used.

Since the FT phase is missing, an initial guess, $\phi_0(f_x, f_y)$, for this phase is provided in the operational block 320. In certain embodiments, this guess does not significantly affect the accuracy of the result of the convergence of the method 300. For this reason, $\phi_0(f_x,f_y)$ can be conveniently chosen to equal zero, or some other real or complex constant (e.g., $\pi$, $\pi/2$). In certain embodiments, the initial guess for the phase can be a previously-stored function $\phi_0(f_x,f_y)$ retrieved from the computer system. In certain embodiments, the initial guess for the phase can be a phase calculated from a previous optical image. In certain embodiments, the initial guess for the phase can be calculated from the measured magnitude using a logarithmic Hilbert transform.

In certain embodiments, the measured magnitude and the estimated phase term are multiplied together to generate an estimated $FT|T_M|\cdot\exp(j\phi_0)$ of the two-dimensional complex transmission function, and the inverse Fourier transform (IFT) of $|T_M|\cdot\exp(j\phi_0)$ is then computed numerically, as shown by the operational block 330, yielding an estimated function $t'(x,y)$, which is a spatial function. In certain embodiments, the operational block 340 comprises applying at least one constraint to the estimated function $t'(x,y)$. For example, in certain embodiments in which the two-dimensional complex transmission function $t(x,y)$ equals or approximates a minimum-phase function (MPF), selected portions of $t'(x,y)$ are set to zero. For example, in certain embodiments, only the $x\geq 0$ and $y\geq 0$ portion of $t'(x,y)$ is retained, and all values of $t'(x,y)$ for $x<0$ or $y<0$ are set to zero, thereby producing a new function $t_1(x,y)$. In certain embodiments in which it is known a priori that the dimensions of $t(x,y)$ are less than $x_0$ along the x-direction and less than $y_0$ along the y-direction (where $x_0$ and $y_0$ are positive numbers), at least some of the values of $t'(x,y)$ outside the rectangular area defined by $x_0>x>0$ and $y_0>y>0$ can be set to zero (e.g., by zeroing values corresponding to $x\geq x_0$ or $y\geq y_0$). In certain other embodiments, applying the at least one constraint comprises constraining the magnitude of the IFT to be less than or equal to a known value (e.g., a maximum intensity of the image). In certain embodiments, applying the constraint to produce $t_1(x,y)$ advantageously speeds up convergence of the method 300. In certain embodiments, the new function $t_1(x,y)$ provided by the operational block 340 serves as a first estimate of the two-dimensional complex MPF.

In certain embodiments, the FT of $t_1(x,y)$ is calculated in the operational block 350, thereby providing a new phase $\phi_1(f_x,f_y)$ and a new magnitude $|T_1(f_x,f_y)|$ for the FT of $t(x,y)$. In certain embodiments, the calculated phase term $\phi_1(f_x,f_y)$ of the FT of $t_1(x,y)$ is calculated using a logarithmic Hilbert transformation of the magnitude of the FT of the two-dimensional complex transmission function. In certain embodiments, the magnitude of the calculated FT spectrum $|T_1(f_x,f_y)|$ is replaced by the measured magnitude $|T_M(f_x,f_y)|$, as shown by the arrow 360. In certain embodiments, the loop is then repeated using $|T_M(f_x,f_y)|$ and $\phi_1(f_x,f_y)$ as the new input function in the operational block 330, which provides a second function $t_2(x,y)$. In certain embodiments, only a single iteration is used, while in other embodiments, this loop is repeated until convergence is achieved. In certain embodiments, convergence is defined to be achieved when the difference between consecutive estimates of the function $\iint|t_n(x,y)-t_{n-1}(x,y)|^2 dxdy/\iint|t_n(x,y)|^2 dxdy$ is less than a predetermined value, for example 0.1%. In certain embodiments, less than 100 iterations are adequate for achieving convergence. In certain embodiments, applying the constraint in the operational block 340 advantageously reduces the number of iterations which achieve convergence.

In certain other embodiments, the loop is repeated a predetermined number of times (e.g., 100). In certain embodiments, the predetermined number of times is selected to be sufficiently large so that the method achieves, or is close to achieving, convergence. In certain embodiments, at the end of the n-th iteration, $t_n(x,y)$ is the recovered complex MPF.

Figure 28A:
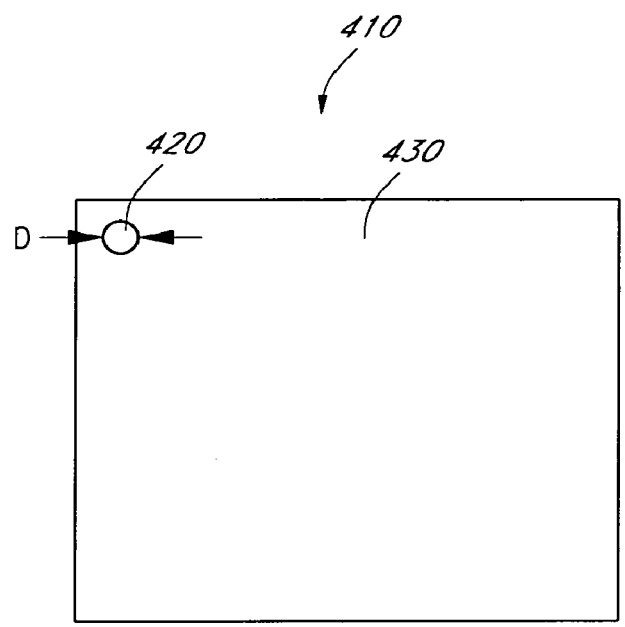
FIG. 28A illustrates an example aperture having a first region with a first transmissivity and a second region with a second transmissivity less than the first transmissivity.
Figure 28B:
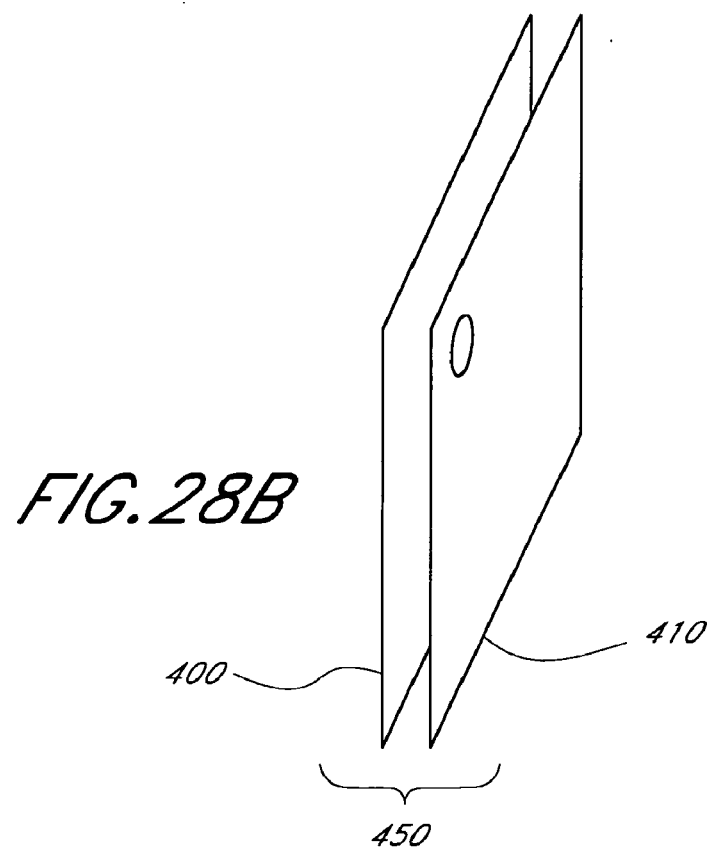
FIG. 28B illustrates an example composite structure formed by placing the aperture near or next to the object of interest.

In certain embodiments, the two-dimensional complex transmission function $t_O(x,y)$ (where x and y are the coordinates along the surface of the object or image) of an object 400 or image of interest, is uniquely recovered from only the two-dimensional FT magnitude using MPF concepts. In certain such embodiments, a synthetic aperture 410 having a complex transmission function of $t_A(x,y)$ is used. FIG. 28A shows an example aperture 410 having a first region 420 with a first transmissivity and a second region 430 with a second transmissivity less than the first transmissivity. In certain embodiments, the first region 420 comprises a hole proximal to one of the corners of the aperture 410 and having a diameter of D. In certain embodiments, the first transmissivity of the first region 420 is approximately 100% (e.g., is substantially transparent), while the second transmissivity of the second region 430 less than approximately 100% (e.g., is only partially transparent). FIG. 28B shows an example composite structure 450 formed by placing the aperture 410 near or next to the object 400 of interest. The two-dimensional aperture 410 shown in FIGS. 28A and 28B is advantageously chosen to make the effective transmission function of the composite structure 450, i.e., $t(x,y)=t_O(x,y)\cdot t_A(x,y)$, close to an MPF for any choice of $t_O(x,y)$. In certain embodiments, the effective complex transmission function of this composite structure 450 is close to an MPF, if not an exact MPF.

In certain embodiments, the field transmission of $t_A(x,y)$ within the first region 420 is approximately 100%. The second region 430 of the aperture 410 can be partially transparent all across its remaining surface with a uniform field transmission coefficient (e.g., less than or equal to approximately 30%). This aperture function forces $t(x,y)=t_O(x,y)\cdot t_A(x,y)$ to become close to an MPF for any given complex object function $t_O(x,y)$. Once $t(x,y)=t_O(x,y)\cdot t_A(x,y)$ is made close to an MPF (or even an exact MPF for some cases), then the recovery of $t_O(x,y)$ from the two-dimensional FT magnitude of $t(x,y)=t_O(x,y)\cdot t_A(x,y)$ is performed using either analytical Hilbert transformations or the iterative error reduction methods as discussed above with regard to determining the phase and magnitude of ultra-short optical pulses.

In certain embodiments, a synthetic aperture 410 compatible with the processes described herein is fabricated by depositing a metal layer (e.g., gold) onto a glass layer, and leaving a small hole in a portion of the layer during the deposition process. In this way, the overall field transmission of the aperture 410 can be controlled precisely. In certain embodiments, the metal layer has a thickness less than one micron. In certain embodiments, the metal layer comprises an approximately rectangular area with at least one corner region. In certain embodiments in which the spatial FT magnitude through the hole covers the maximum spatial frequency of the image to be recovered (e.g., the FT spectrum of the hole function covers the FT spectrum of the image to be recovered, as with other spectral interferometry configurations), the shape of the hole is not critical, and can be chosen to be any shape. The location of the hole on the synthetic aperture 410 is preferably in proximity to one of the corners. For the recovery results, it does not matter which corner is chosen. Using a different corner will simply flip the recovered complex image by 90° or 180° without changing any features.

The size of the first region 420 in certain embodiments is sufficiently narrow so that its spatial FT magnitude covers at least the maximum spatial frequency of the object image. In certain embodiments, the size of the first region 420 is chosen to be as narrow as possible without violating the scalar field theory assumptions involved in the imaging systems that yield the FT magnitudes. (See, e.g., J. W. Goodman, "*Introduction to Fourier Optics*," McGraw-Hill, New York, 2002.) In certain such embodiments, the size of the first region 420 is restricted to be larger than the wavelength of the light source used (e.g., by at least by a factor of two or by at least a factor of three). In certain embodiments, the width of the first region 420 does not determine the resolution of the recovered image as long as the FT spectrum of the hole function covers all the spatial frequencies of the object image function, as is true for other SIMBA-based techniques. However, the resolution of the recovered image is not limited by the size of the first region 420. In accordance to the description herein regarding the determination of the magnitude and phase of ultra-short optical pulses, a sample optical pulse (which corresponds the complex two-dimensional object function) that is temporally only approximately 2 times wider than the dummy strong pulse (which corresponds to the 100% transmitting hole on the synthetic aperture) can be recovered without having any resolution problems due to the wide dummy pulse. That is, the temporal resolution of the recovered sample pulse was much narrower than the temporal width of the used dummy pulse.

In certain embodiments, the recovery of the original image around the first region 420 is not good since the recovery around the first region 420 will be sacrificed for the excellent recovery of the remaining areas on the object surface. Therefore, in certain embodiments, to lose as small an area as possible in the recovered image, a small size for the first region 420 of the synthetic aperture 410 is advantageously chosen.

In certain embodiments, a generally uniform field transmission coefficient of approximately 30% or less works for the image recovery based on the SIMBA technique described herein with regard to the determination of the magnitude and phase of ultra-short optical pulses. However, the selection of a low transmission coefficient (e.g., less than or equal to approximately 1%) would be problematic for noise sensitivity of the technique. In certain embodiments, in accordance with the discussion herein with regard to the determination of the magnitude and phase of ultra-short optical pulses, the transmission coefficient of the synthetic aperture is advantageously chosen to be just low enough that the SIMBA technique converges without reducing the noise performance of the technique.

Femtosecond Spectroscopy

Figure 29:
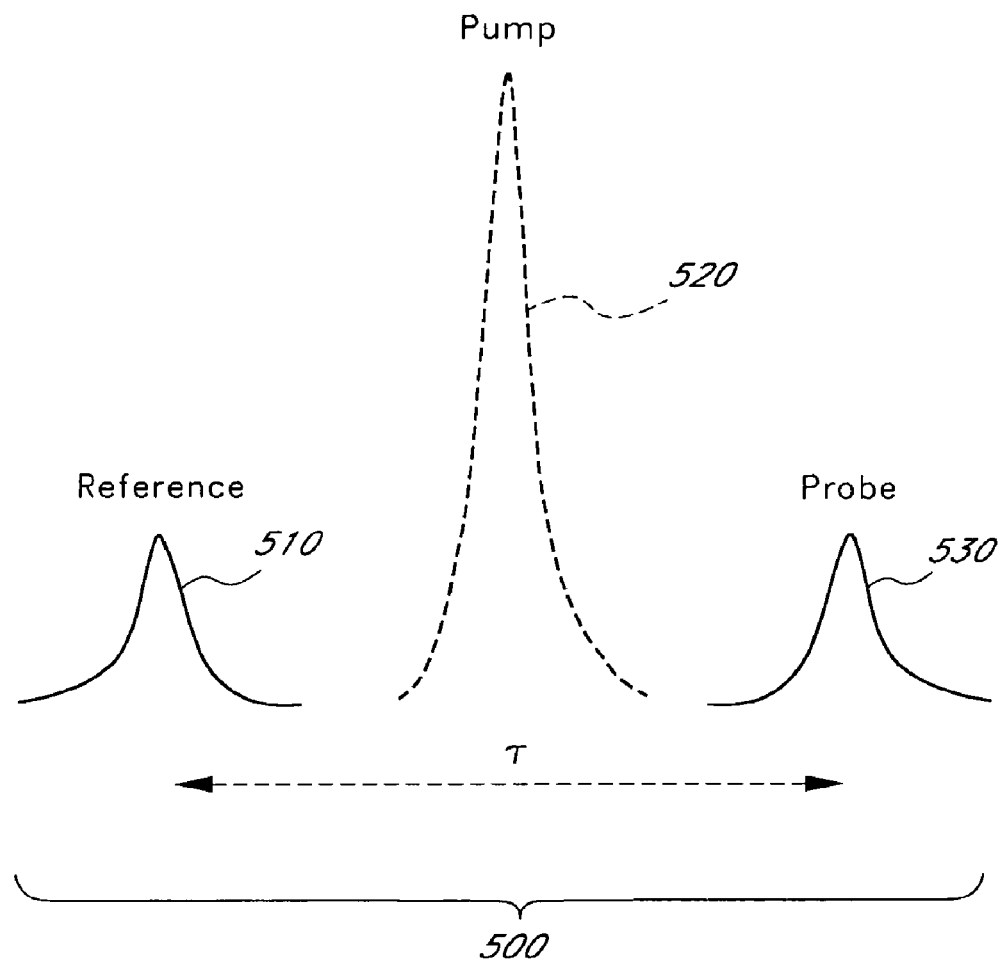
FIG. 29 illustrates a pulse train comprising a reference pulse, a pump pulse, and a probe pulse.

Various fields can have different experimental configurations in which femtosecond spectral interferometry is used to resolve fast transient responses. However, these experimental configurations typically have some commonalities. For example, these experimental configurations typically commonly utilize a pulse train, as shown in FIG. 29 (e.g., for classical femtosecond spectroscopy). The pulse train 500 of FIG. 29 comprises a reference pulse 510, followed in time by a pump pulse 520, which itself is followed by a probe pulse 530. The function of the pump pulse 520 is to induce a transient change in the sample or material system being analyzed. In certain embodiments, the first reference pulse 510 interacts with the sample without being affected by the pump pulse 520, whereas the probe pulse 530 interacts with the sample and picks up a certain phase and magnitude modulation due to the changes of the sample induced by the pump pulse 520. This differential change in phase and magnitude of the probe pulse 530, as a function of time, carries information on the transient response of the sample being analyzed. In certain embodiments, this information is recorded by sending both the reference pulse 510 and the probe pulse 530 colinearly to a spectrum analyzer, which records the coherent interference of the two pulses in the frequency domain. The pump pulse 520 is most often filtered out, e.g., by choosing a different propagation direction.

Various different approaches have previously been used to recover the differential phase and magnitude changes induced by the pump pulse 520 from the recorded power spectrum of the pulse sequence formed by the reference pulse 510 and the probe pulse 530. In certain embodiments, the measured power spectrum can be expressed as:

$$I(\omega)=|E_p(\omega)|^2+|E_r(\omega)|^2+2|E_p(\omega)||E_r(\omega)|\cos(\Delta\Phi+\omega\tau) \qquad (1)$$

where $I(\omega)$ is the recorded power spectrum, w is the angular frequency, $E_{p,r}(\omega)$ is the FT of the temporal profile of the probe and reference pulses, respectively, $\Delta\Phi$ is the phase difference between the probe and reference pulses induced by the pump pulse, and $\tau$ is the time delay between the reference and probe pulses. In principle, measuring the change induced in the FT magnitudes of the pulses ($|E_p(\omega)|$ and $|E_r(\omega)|$) is trivial and does not require a spectral interferometry configuration since measuring the spectrum of the probe pulse with and without the pump pulse would be enough to see the differential change. However, the recovery of the phase difference, $\Delta\Phi$, is most often, if not always, the desired information, and is more difficult to determine.

Previous spectral interferometry techniques used the local maxima or minima in the fringe pattern observed in $I(\omega)$ to recover the pump-induced differential phase change, $\Delta\Phi$, from Equation (1). (See, e.g., F. Reynaud et al., "Measurement of phase shifts introduced by nonlinear optical phenomena on subpicosecond pulses," Opt. Lett., Vol. 14, page 275 (1989); E. Tokunaga et al., "Frequency-domain interferometer for femtosecond time-resolved phase spectroscopy," Opt. Lett., Vol. 17, page 1131 (1992); E. Tokunaga et al., "Induced phase modulation of chirped continuum pulses studied with a femtosecond frequency-domain interferometer," Opt. Lett., Vol. 18, page 370 (1993).) However, this simple approach recovers the phase difference, $\Delta\Phi$, for only discrete frequencies with a limited resolution. One way to increase the resolution of the phase recovery is to move the fringes closer together by increasing the value of $\tau$ and utilizing a higher-resolution spectrum analyzer, however such a higher-resolution spectrum analyzer is not always available. In practice, inverting the cosine expression in Equation (1) by means of the arccosine function is not a feasible solution, as discussed by L. Lepetit et al. in "Linear techniques of phase measurement by femtosecond spectral interferometry for applications is spectroscopy," J. Opt. Soc. Am. B, Vol. 12, page 2467 (1995). This approach (i) causes an ambiguity of $2\pi$ at every frequency; and (ii) requires the division of $2|E_p(\omega)||E_r(\omega)|\cos(\Delta\Phi+\omega\tau)$ with $2|E_p(\omega)||E_r(\omega)|$, which introduces extra noise into the recovery.

Fourier transform spectral interferometry (FTSI) has recently been used instead of this earlier approach. This improved technique involves directly taking the inverse FT (IFT) of Equation (1), which yields two side lobes (at $t=\pm\tau$) and a central lobe at $t=0$. The logistics of this FTSI approach is similar to the analytical techniques described above with regard to determining the phase and magnitude of ultra-short optical pulses. By choosing the time delay, $\tau$, to be larger than a minimum value, the side lobes advantageously do not overlap with the central lobe and can individually be recovered. Then, the phase of the FT of each lobe simply yields the target phase difference $\Delta\Phi$.

One drawback of the FTSI approach in detecting only $\Delta\Phi$ is the assumption that the reference and probe pulses both have the same initial phase, such that the recovered $\Delta\Phi$ only represents the pump-induced effects. For some applications, this assumption is hard to achieve and therefore the recovery of the relative phase difference between the reference and probe pulses is not sufficient by itself. In certain such cases, a self-referenced pulse characterization tool, such as frequency-resolved optical gating (FROG) which is described by R. Trebino et al. in "Using phase retrieval to measure the intensity and phase of ultrashort pulses: frequency-resolved optical gating," J. Opt. Soc. Am. A, Vol. 10, page 1101 (1993), can be used to fully characterize the reference pulse and then the phase of the probe pulse is fully retrieved from the recovered phase difference, ΔΦ. However, this approach has the disadvantages of extra cost, complexity, and longer measurement time associated with the complex FROG configuration.

In certain embodiments, the same concepts of spectral interferometry using minimum-phase-based algorithms (SIMBA) as described herein are applied to the field of femtosecond spectroscopy. SIMBA-based femtosecond spectroscopy, as discussed herein (see, e.g., FIG. 3 and corresponding description), advantageously provides a convenient alternative to various currently existing techniques used to probe fast transient changes in different material systems.

Figure 30:
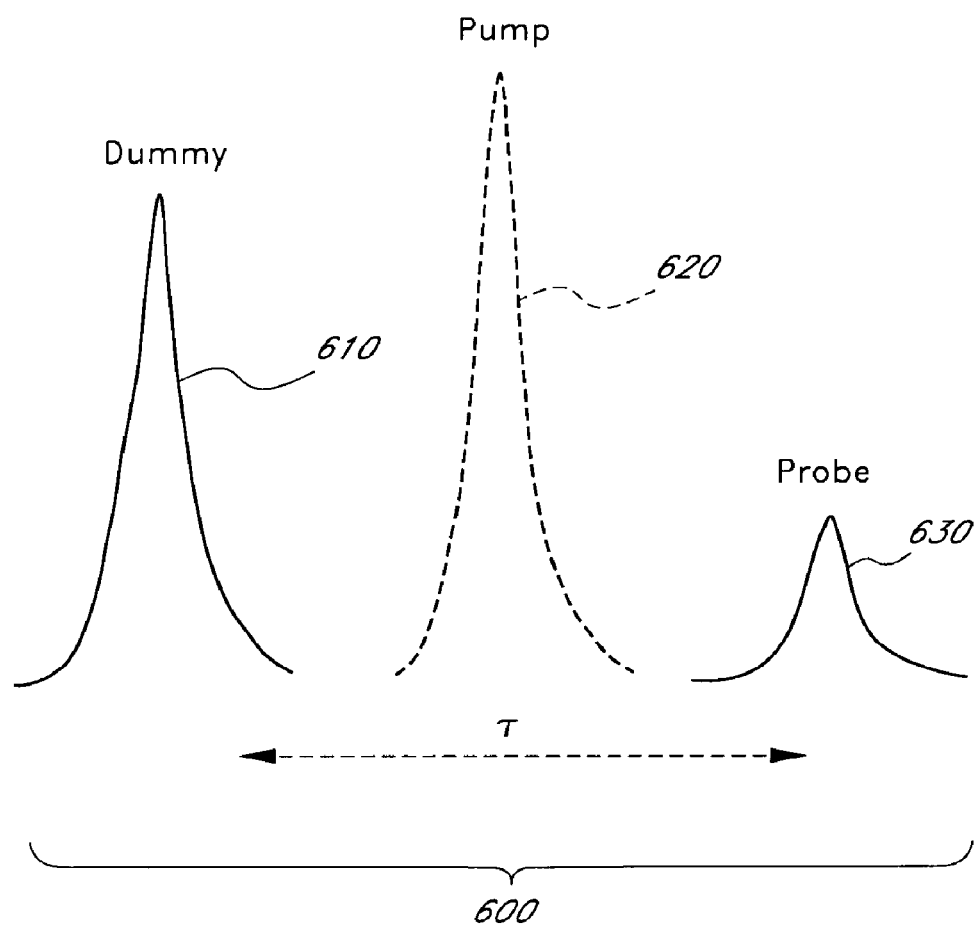
FIG. 30 illustrates an example pulse train comprising a dummy pulse, a pump pulse, and a probe pulse.

FIG. 30 illustrates a pulse train 600 comprising a dummy pulse 610, a pump pulse 620, and a probe pulse 630 which are compatible with certain embodiments described herein utilizing a SIMBA-based femtosecond spectroscopy analysis. In certain embodiments, the dummy pulse 610 satisfies various conditions, namely: (i) its bandwidth covers the bandwidth of the probe pulse 630; (ii) its temporal width is narrower than the temporal width of the probe pulse 630 (e.g., by a factor of approximately 2 or more); and (iii) its peak amplitude is larger than the peak amplitude of the probe pulse 630 (e.g., by a factor of approximately 5 or more). In certain embodiments, one or more of these three conditions are not satisfied. The first condition regarding the bandwidth is not specific to the SIMBA technique, but is shared by all SI-based techniques. Furthermore, the third condition in certain embodiments is advantageous since the weak probe pulse 630 is enhanced due to the higher power dummy pulse 610, a concept of which is common to all heterodyne systems. (See, e.g., L. Lepetit et al. in "Linear techniques of phase measurement by femtosecond spectral interferometry for applications is spectroscopy," J. Opt. Soc. Am. B, Vol. 12, page 2467 (1995).)

By using SIMBA to analyze femtosecond spectroscopy measurements, certain embodiments described herein provide various advantages including but not limited to: (i) no need for a known reference pulse (e.g., no need for a complex FROG configuration) to measure the phase and magnitude of the reference pulse; (ii) there is no minimum constraint on the delay parameter, τ, which means that a lower-resolution spectrum analyzer can be used; (iii) there is no time reversal ambiguity present unlike second-harmonic FROG; and (iv) the signal-to-noise ratio is improved with respect to all SI-based techniques, since rather than directly taking the IFT of I(ω) in Equation (1), the SIMBA technique makes use of $\sqrt{I(\omega)}$.

The second advantage mentioned above also opens the possibility of using the pump pulse itself as the reference pulse, reducing the number of pulses used in the pulse train by one. Certain embodiments that utilize a pump pulse that is colinear with the probe pulse advantageously reduce the complexity of the measurement configuration. In certain such embodiments, the fact that the phase and magnitude of the pump pulse, which now also acts as a reference pulse, are modified by its interaction with the material system is not important for SIMBA-based femtosecond spectroscopy, as long as the above-mentioned conditions on the dummy pump pulse are still met.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of utilizing an optical image processing system, the method comprising:
 (a) providing to the optical image processing system a measured magnitude of the Fourier transform of a complex transmission function of an object or optical image, wherein the complex transmission function equals or approximates a minimum-phase function or a maximum-phase function;
 (b) providing to the optical image processing system an estimated phase term of the Fourier transform of the complex transmission function;
 (c) using the optical image processing system for multiplying the measured magnitude and the estimated phase term to generate an estimated Fourier transform of the complex transmission function;
 (d) calculating an inverse Fourier transform of the estimated Fourier transform, wherein the inverse Fourier transform is a spatial function; and
 (e) calculating an estimated complex transmission function by applying at least one constraint indicative of a known property of the complex transmission function to the inverse Fourier transform by making the inverse Fourier transform conform to the known property.

2. The method of claim 1, further comprising using the optical image processing system for:
 (f) calculating a Fourier transform of the estimated complex transmission function; and
 (g) calculating a calculated phase term of the Fourier transform of the complex transmission function.

3. The method of claim 2, further comprising:
 (h) using the calculated phase term of (g) as the estimated phase term of (c) and repeating (c)-(e).

4. The method of claim 3, wherein (c)-(h) are iteratively repeated until the estimated complex transmission function reaches convergence.

5. The method of claim 4, wherein convergence is reached when a difference between estimated complex transmission functions obtained after two consecutive iterations is less than a predetermined value.

6. The method of claim 5, wherein the predetermined value is 0.1% of the estimated complex transmission function of an iteration.

7. The method of claim 3, wherein (c)-(h) are iteratively repeated a predetermined number of times.

8. The method of claim 1, wherein the optical image processing system comprises a composite structure comprising an object of interest and an element near or next to the object of interest, the element having a first region with a first transmissivity and a second region with a second transmissivity less than the first transmissivity.

9. The method of claim 8, wherein providing the measured magnitude of the Fourier transform of a complex transmission function comprises:
 transmitting plane waves of light through the composite structure;
 measuring a spatial frequency spectrum of the transmitted light; and calculating the square root of the measured spatial frequency spectrum.

10. The method of claim 9, wherein the first region has a size larger than the wavelength of the light transmitted through the composite structure.

11. The method of claim 10, wherein the first region is at least a factor of two larger than the wavelength of the light transmitted through the composite structure.

12. The method of claim 8, wherein the second region comprises a metal layer on a glass layer, and the first region comprises a hole in the metal layer.

13. The method of claim 8, wherein providing the measured magnitude of the Fourier transform of the complex transmission function comprises providing a calculated square root of a previously-measured spatial frequency spectrum of light transmitted through the composite structure.

14. The method of claim 1, wherein providing the estimated phase term of the Fourier transform of the complex transmission function comprises providing an initial estimated phase term equal to a real or complex constant.

15. The method of claim 14, wherein the initial estimated phase term is a previously-stored function retrieved from a computer system.

16. The method of claim 14, wherein the initial estimated phase term is a phase calculated from a previous optical image.

17. The method of claim 14, wherein the initial estimated phase term is calculated from the measured magnitude using a logarithmic Hilbert transform.

18. The method of claim 1, wherein the complex transmission function equals or approximates a minimum-phase function and applying the at least one constraint to the inverse Fourier transform comprises setting the inverse Fourier transform to zero for selected portions of the complex transmission function.

19. A non-transitory tangible computer-readable storage medium having instructions stored thereon which cause a general-purpose computer of an optical image processing system to perform a method comprising:
(a) providing to the optical image processing system a measured magnitude of the Fourier transform of a complex transmission function of an object or optical image, wherein the complex transmission function equals or approximates a minimum-phase function or a maximum-phase function;
(b) providing to the optical image processing system an estimated phase term of the Fourier transform of the complex transmission function;
(c) using the optical image processing system for multiplying the measured magnitude and the estimated phase term to generate an estimated Fourier transform of the complex transmission function;
(d) calculating an inverse Fourier transform of the estimated Fourier transform, wherein the inverse Fourier transform is a spatial function; and
(e) calculating an estimated complex transmission function by applying at least one constraint indicative of a known property of the complex transmission function to the inverse Fourier transform by making the inverse Fourier transform conform to the known property.

20. A computer system for processing an optical image comprising:
means for estimating an estimated phase term of a Fourier transform of a complex transmission function of the optical image, wherein the complex transmission function equals or approximates a minimum-phase function or a maximum-phase function;
means for multiplying a measured magnitude of the Fourier transform of the complex transmission function and the estimated phase term to generate an estimated Fourier transform of the complex transmission function of the optical image;
means for calculating an inverse Fourier transform of the estimated Fourier transform, wherein the inverse Fourier transform is a spatial function; and
means for calculating an estimated complex transmission function of the optical image by applying at least one constraint indicative of a known property of the complex transmission function to the inverse Fourier transform by making the inverse Fourier transform conform to the known property; and
means for displaying the estimated complex transmission function of the optical image.

* * * * *

UNITED STATES PATENT AND TRADEMARK OFFICE
CERTIFICATE OF CORRECTION

PATENT NO. : 8,082,117 B2
APPLICATION NO. : 12/623322
DATED : December 20, 2011
INVENTOR(S) : Ozcan et al.

Page 1 of 1

It is certified that error appears in the above-identified patent and that said Letters Patent is hereby corrected as shown below:

At Sheet 6 of 30, Fig. 6 (Y-Axis), change "Imaginery" to --Imaginary--.

At Column 8, Line 18, change "visa versa." to --vice versa.--.

At Column 20, Line 49, change "Franhaufer" to --Fraunhofer--.

At Column 24, Line 12, change "w" to --$\omega$--.

Signed and Sealed this
Sixth Day of November, 2012

David J. Kappos
*Director of the United States Patent and Trademark Office*